US 12,233,894 B2

(12) United States Patent
Nakamura et al.

(10) Patent No.: US 12,233,894 B2
(45) Date of Patent: Feb. 25, 2025

(54) OCCUPANT STATE DETECTION SYSTEM

(71) Applicant: SUBARU CORPORATION, Tokyo (JP)

(72) Inventors: Ryota Nakamura, Tokyo (JP); Tsukasa Mikuni, Tokyo (JP); Takuya Homma, Tokyo (JP); Yutaka Ishii, Tokyo (JP); Masatoshi Tsuge, Tokyo (JP); Kazuhiro Hayakawa, Tokyo (JP); Toru Kato, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 301 days.

(21) Appl. No.: 17/698,377

(22) Filed: Mar. 18, 2022

(65) Prior Publication Data
US 2022/0315031 A1 Oct. 6, 2022

(30) Foreign Application Priority Data

Mar. 30, 2021 (JP) ................. 2021-058860

(51) Int. Cl.
*B60W 50/14* (2020.01)
*B60W 40/08* (2012.01)
(Continued)

(52) U.S. Cl.
CPC ............ *B60W 50/14* (2013.01); *B60W 40/09* (2013.01); *G06V 20/597* (2022.01);
(Continued)

(58) Field of Classification Search
None
See application file for complete search history.

(56) References Cited

U.S. PATENT DOCUMENTS

2006/0267781 A1* 11/2006 Coulter ................. B60R 25/257
340/573.7
2012/0286957 A1* 11/2012 Frechette ............. B60K 28/066
340/575
(Continued)

FOREIGN PATENT DOCUMENTS

JP   2008-123449 A   5/2008
JP   2014-004091 A   1/2014
(Continued)

OTHER PUBLICATIONS

Office Action dated Aug. 27, 2024, from corresponding Japan Patent Application No. 2021-058860, 5 pages.

*Primary Examiner* — Christian Chace
*Assistant Examiner* — Shayne M. Gilbertson
(74) *Attorney, Agent, or Firm* — Rimon P.C.

(57) ABSTRACT

An occupant state detection system includes an occupant monitoring apparatus, an occupant state detection apparatus, and a determination apparatus. The occupant state detection apparatus includes one or more processors and one or more memories. The one or more processors cooperate with one or more programs included in the one or more memories to receive occupant monitoring data from the occupant monitoring apparatus and determination data from the determination apparatus. On the basis of the determination data, the one or more processors make assignment of a part to be monitored, of an occupant in a vehicle, to be monitored by the occupant monitoring apparatus, to detect a physical state of the occupant.

7 Claims, 15 Drawing Sheets

(51) Int. Cl.
B60W 40/09 (2012.01)
G06V 20/59 (2022.01)

(52) U.S. Cl.
CPC .............. *B60W 2040/0872* (2013.01); *B60W 2050/143* (2013.01); *B60W 2540/225* (2020.02)

(56) References Cited

U.S. PATENT DOCUMENTS

| | | | |
|---|---|---|---|
| 2013/0311074 A1* | 11/2013 | Siira | F02D 41/26 |
| | | | 701/113 |
| 2019/0362167 A1 | 11/2019 | Nakamura et al. | |
| 2020/0086813 A1* | 3/2020 | Kabatek | B60N 2/002 |
| 2020/0334453 A1* | 10/2020 | Thomas | B60N 2/0026 |
| 2022/0073092 A1 | 3/2022 | Yuasa et al. | |
| 2023/0038920 A1* | 2/2023 | Mizoi | B60N 2/0244 |
| 2023/0166638 A1* | 6/2023 | Kotani | B60N 2/0022 |
| | | | 701/49 |
| 2024/0135729 A1* | 4/2024 | Kumagai | G06V 20/593 |

FOREIGN PATENT DOCUMENTS

| | | |
|---|---|---|
| JP | 2019-202726 A | 11/2019 |
| WO | 2020-255287 A1 | 12/2020 |

* cited by examiner

| PART TO BE MONITORED | | | FACE | WHOLE BODY |
|---|---|---|---|---|
| DATA TO BE ACQUIRED | EXPRESSION | GAZE DIRECTION | ○ | |
| | | FACIAL POSE | ○ | |
| | | NUMBER OF BLINKS | ○ | |
| | | EYE APERTURE | ○ | |
| | | EYE MOVEMENT | ○ | |
| | BEHAVIOR | POSTURE | | ○ |
| | | BODY MOTION | | ○ |
| | | SLEEPING TIME | | ○ |
| | | NUMBER OF TIMES OCCUPANT TURNS OVER IN THEIR SLEEP | | ○ |
| | | RESTING TIME | | ○ |
| | | | ASSIGNMENT PROCESSING A | ASSIGNMENT PROCESSING B |

FIG. 3

| DETERMINATION DATA | | | TRAVELING STATE | STOPPED STATE |
|---|---|---|---|---|
| PART TO BE MONITORED | | | FACE ↓ | WHOLE BODY ↓ |
| DATA TO BE ACQUIRED | EXPRESSION | GAZE DIRECTION | ○ | |
| | | FACIAL POSE | ○ | |
| | | NUMBER OF BLINKS | ○ | |
| | | EYE APERTURE | ○ | |
| | | EYE MOVEMENT | ○ | |
| | BEHAVIOR | POSTURE | | ○ |
| | | BODY MOTION | | ○ |
| | | SLEEPING TIME | | ○ |
| | | NUMBER OF TIMES OCCUPANT TURNS OVER IN THEIR SLEEP | | ○ |
| | | RESTING TIME | | ○ |
| | | | ASSIGNMENT PROCESSING C | ASSIGNMENT PROCESSING D |

FIG. 6

| DETERMINATION DATA | TRAVELING STATE | STOPPED STATE |
|---|---|---|

↓ ↓

| | | PART TO BE MONITORED | DRIVER | EVERY OCCUPANT |
|---|---|---|---|---|
| DATA TO BE ACQUIRED | EXPRESSION | GAZE DIRECTION | ○ | |
| | | FACIAL POSE | ○ | |
| | | NUMBER OF BLINKS | ○ | |
| | | EYE APERTURE | ○ | |
| | | EYE MOVEMENT | ○ | |
| | BEHAVIOR | POSTURE | | ○ |
| | | BODY MOTION | | ○ |
| | | SLEEPING TIME | | ○ |
| | | NUMBER OF TIMES OCCUPANT TURNS OVER IN THEIR SLEEP | | ○ |
| | | RESTING TIME | | ○ |
| | | | ASSIGNMENT PROCESSING E | ASSIGNMENT PROCESSING F |

FIG. 9

| DETERMINATION DATA | TRAVELING STATE | STOPPED STATE |
|---|---|---|
| PART TO BE MONITORED | FACE AND WHOLE BODY | PART OF FACE AND WHOLE BODY |

| DATA TO BE ACQUIRED | | | TRAVELING STATE | STOPPED STATE |
|---|---|---|---|---|
| | EXPRESSION | GAZE DIRECTION | ○ | |
| | | FACIAL POSE | ○ | ○ |
| | | NUMBER OF BLINKS | ○ | |
| | | EYE APERTURE | ○ | ○ |
| | | EYE MOVEMENT | ○ | |
| | BEHAVIOR | POSTURE | ○ | ○ |
| | | BODY MOTION | ○ | ○ |
| | | | ASSIGNMENT PROCESSING G | ASSIGNMENT PROCESSING H |

FIG. 12

| DETERMINATION DATA | | | TRAVELING STATE | | STOPPED STATE | |
|---|---|---|---|---|---|---|
| | | | ↓ | | ↓ | |
| | | | FIRST OCCUPANT MONITORING APPARATUS 10a | SECOND OCCUPANT MONITORING APPARATUS 10b | FIRST OCCUPANT MONITORING APPARATUS 10a | SECOND OCCUPANT MONITORING APPARATUS 10b |
| PART TO BE MONITORED | | | FACE | | WHOLE BODY | |
| DATA TO BE ACQUIRED | EXPRESSION | GAZE DIRECTION | ○ | ○ | | |
| | | FACIAL POSE | ○ | ○ | | |
| | | NUMBER OF BLINKS | ○ | ○ | | |
| | | EYE APERTURE | ○ | ○ | | |
| | | EYE MOVEMENT | ○ | ○ | | |
| | BEHAVIOR | POSTURE | | | ○ | ○ |
| | | BODY MOTION | | | ○ | ○ |
| | | SLEEPING TIME | | | ○ | ○ |
| | | NUMBER OF TIMES OCCUPANT TURNS OVER IN THEIR SLEEP | | | ○ | ○ |
| | | RESTING TIME | | | ○ | ○ |
| | BIOLOGICAL DATA | HEART RATE | | ○ | | ○ |
| | | HEART RATE VARIABILITY | | ○ | | ○ |
| | | RESPIRATION RATE | | ○ | | ○ |
| | | BRAIN WAVE | | ○ | | ○ |
| | | | ASSIGNMENT PROCESSING I | | ASSIGNMENT PROCESSING J | |

FIG. 15

OCCUPANT STATE DETECTION SYSTEM

CROSS-REFERENCE TO RELATED APPLICATIONS

This application claims priority from Japanese Patent Application No. 2021-058860 filed on Mar. 30, 2021, the entire contents of which are hereby incorporated by reference.

BACKGROUND

The technology relates to an occupant state detection system.

In recent years, advance has been made in developments of so-called driver monitoring systems (DMS). Driver monitoring systems monitor a driver's state for purposes of assistance with safe driving of vehicles. For example, such a driver monitoring system detects where a driver is gazing at. In a case where the driver is not aware of a current situation, the driver monitoring system gives an alarm to the driver.

Examples of this kind of apparatus include an occupant monitoring apparatus that monitors occupants including a driver. This occupant monitoring apparatus makes it possible to reduce the number of imaging devices to be used, even in a case with an increase in the number of the occupants to be monitored. For example, reference is made to Japanese Unexamined Patent Application Publication (JP-A) No. 2019-202726.

SUMMARY

An aspect of the technology provides an occupant state monitoring system including an occupant monitoring apparatus, an occupant state detection apparatus, and a determination apparatus. The occupant monitoring apparatus is configured to monitor a physical state of an occupant in a vehicle. The occupant state detection apparatus is configured to detect the physical state of the occupant in the vehicle on the basis of occupant monitoring data from the occupant monitoring apparatus. The determination apparatus is configured to determine whether the vehicle is in a traveling state or a stopped state. The occupant state detection apparatus includes one or more processors, and one or more memories configured to be communicably coupled to the one or more processors. The one or more processors are configured to cooperate with one or more programs included in the one or more memories to: receive the occupant monitoring data and determination data from the determination apparatus; store the received occupant monitoring data and the received determination data in the one or more memories; and on the basis of the determination data, make assignment of a part to be monitored, of the occupant in the vehicle, to be monitored by the occupant monitoring apparatus, to detect the physical state of the occupant.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 3 summarizes relation of monitoring assignment processing to occupant monitoring data, in the occupant state detection system according to the first embodiment of the disclosure.

FIG. 6 summarizes relation of monitoring assignment processing to occupant monitoring data, in the occupant state detection system according to the second embodiment of the disclosure.

FIG. 9 summarizes relation of monitoring assignment processing to occupant monitoring data, in the occupant state detection system according to the third embodiment of the disclosure.

FIG. 12 summarizes relation of monitoring assignment processing to occupant monitoring data, in the occupant state detection system according to the fourth embodiment of the disclosure.

FIG. 15 summarizes relation of monitoring assignment processing to occupant monitoring data, in the occupant state detection system according to the additional embodiment of the disclosure.

DETAILED DESCRIPTION

Figure 1:
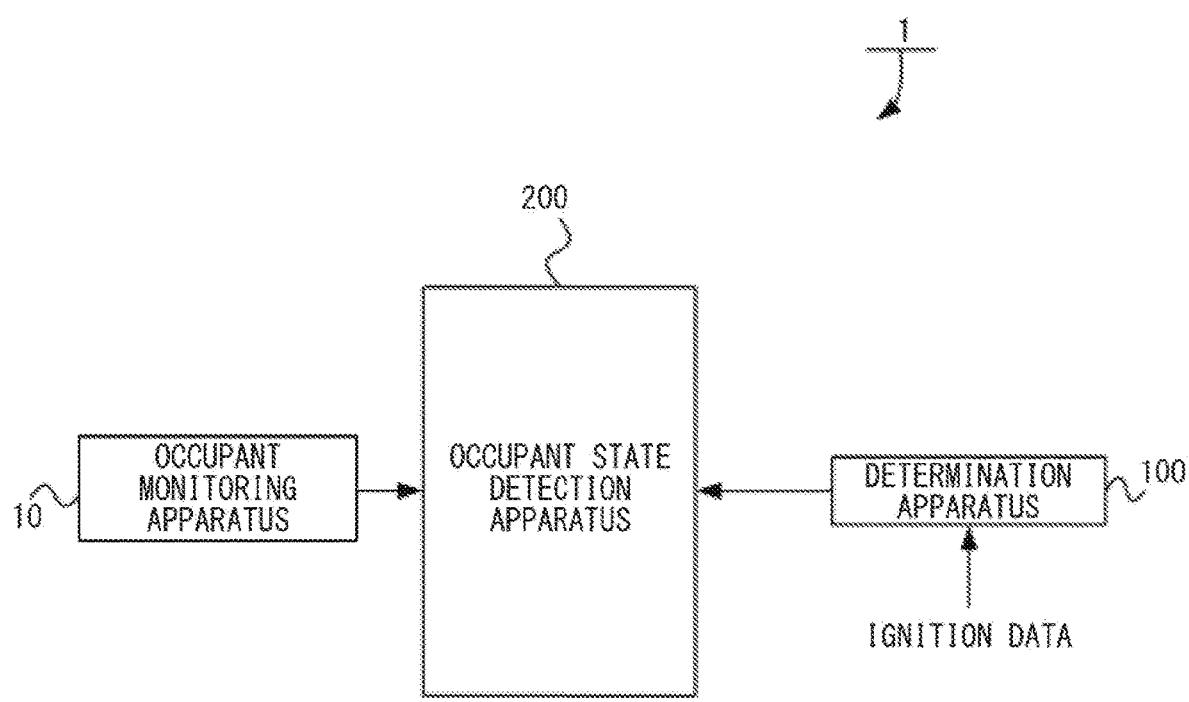
FIG. 1 is a block diagram illustrating a configuration of an occupant state detection system according to a first embodiment of the disclosure.

Existing techniques as disclosed in JP-A No. 2019-202726 are intended for monitoring occupants including a driver while a vehicle is in a traveling state. The existing techniques do not include monitoring occupants including a driver of a vehicle to determine physical states of the occupants while the vehicle is in a stopped state.

The traveling state and the stopped state have considerable differences in terms of targets to be monitored by an occupant monitoring apparatus. Thus, simply applying the same occupant monitoring control as in the traveling state to the stopped state may hinder accurate detection of states of occupants.

It is desirable to provide an occupant state detection system that makes it possible to optimize a monitoring method for a vehicle in a traveling state and a monitoring method for a vehicle in a stopped state, to detect accurately a physical state of an occupant.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

The example embodiments of the technology are described below with reference to FIGS. 1 to 15.

First Embodiment

An occupant state detection system 1 according to a first embodiment is described with reference to FIGS. 1 to 4.

<Configuration of Occupant State Detection System 1>

As illustrated in FIG. 1, the occupant state detection system 1 according to this embodiment may include, without limitation, an occupant monitoring apparatus 10, a determination apparatus 100, and an occupant state detection apparatus 200.

The occupant monitoring apparatus 10 is configured to monitor a physical state of an occupant in the vehicle with the use of a camera. The camera may incorporate, for example, an imaging element such as a CCD (Charge Coupled Device) or a CIS (CMOS Image Sensor), and acquire an image of an occupant in the vehicle captured by the imaging element. The image of an occupant in the vehicle may include a moving image and a still image.

The camera of the occupant monitoring apparatus 10 may be a dedicated camera. In one example, in a case where the occupant state detection system 1 includes an occupant recognition apparatus, a camera in the occupant recognition apparatus may serve as the camera of the occupant monitoring apparatus 10. In one example, the camera of the occupant monitoring apparatus 10 may include both an optical camera and a near-infrared camera.

In the occupant state detection system 1 according to this embodiment, the occupant monitoring apparatus 10 is configured to monitor externally observable data such as expression, a posture, and behavior of an occupant.

Non-limiting examples of occupant-related data to be obtained mainly from the occupant monitoring apparatus 10 may include a gaze direction, a facial pose, the number of blinks, an eye aperture, an eye movement, a posture, a body motion, the number of times an occupant turns over in their sleep, sleeping time, a sleeping state, and resting time.

For example, the eye aperture serves as an indication of detection of an occupant dozing. The number of blinks serves as an indication of detection of, for example, a degree of asthenopia and shortage of sleeping time. The eye movement serves as an indication of detection of, for example, the sleeping state of an occupant.

It is to be noted that details of data to be monitored by the occupant monitoring apparatus 10 are described later.

The determination apparatus 100 is configured to determine whether the vehicle is in a traveling state or a stopped state.

For example, the determination apparatus 100 may acquire ignition data from an unillustrated CPU (Central Processing Unit) of the vehicle. In a case where ignition is in an ON state, the determination apparatus 100 may determine that the vehicle is in the traveling state. In a case where the ignition is in an OFF state, the determination apparatus 100 may determine that the vehicle is in the stopped state. The description that ignition is in the ON state means a power switch of the vehicle is in an ON state. The description that ignition is in the OFF state means the power switch of the vehicle is in an OFF state. Note that, the power switch is called a power source switch or a main switch.

The determination apparatus 100 may further monitor, for example, a vehicle speed pulse and an operation state of a parking brake. On the basis of the vehicle speed pulse and the operation state of the parking brake together with the ON and OFF states of the ignition, the determination apparatus 100 may determine whether the vehicle is in the traveling state or the stopping state.

The occupant state detection apparatus 200 is configured to detect the physical state of the occupant in the vehicle on the basis of occupant monitoring data from the occupant monitoring apparatus 10.

In one example, the occupant state detection apparatus 200 may make assignment of a part to be monitored and data to be acquired, of an occupant in the vehicle, to be monitored by the occupant monitoring apparatus 10 in a case where the occupant state detection apparatus 200 has received, from the determination apparatus 100, data indicating that the vehicle is in the stopped state.

The occupant state detection apparatus 200 may receive the occupant monitoring data from the occupant monitoring apparatus 10 provided with the assignment of the part to be monitored and the data to be acquired, of the occupant. Thus, the occupant state detection apparatus 200 may detect the physical state of the occupant on the basis of the occupant monitoring data.

<Configuration of Occupant State Detection Apparatus 200>

Figure 2:
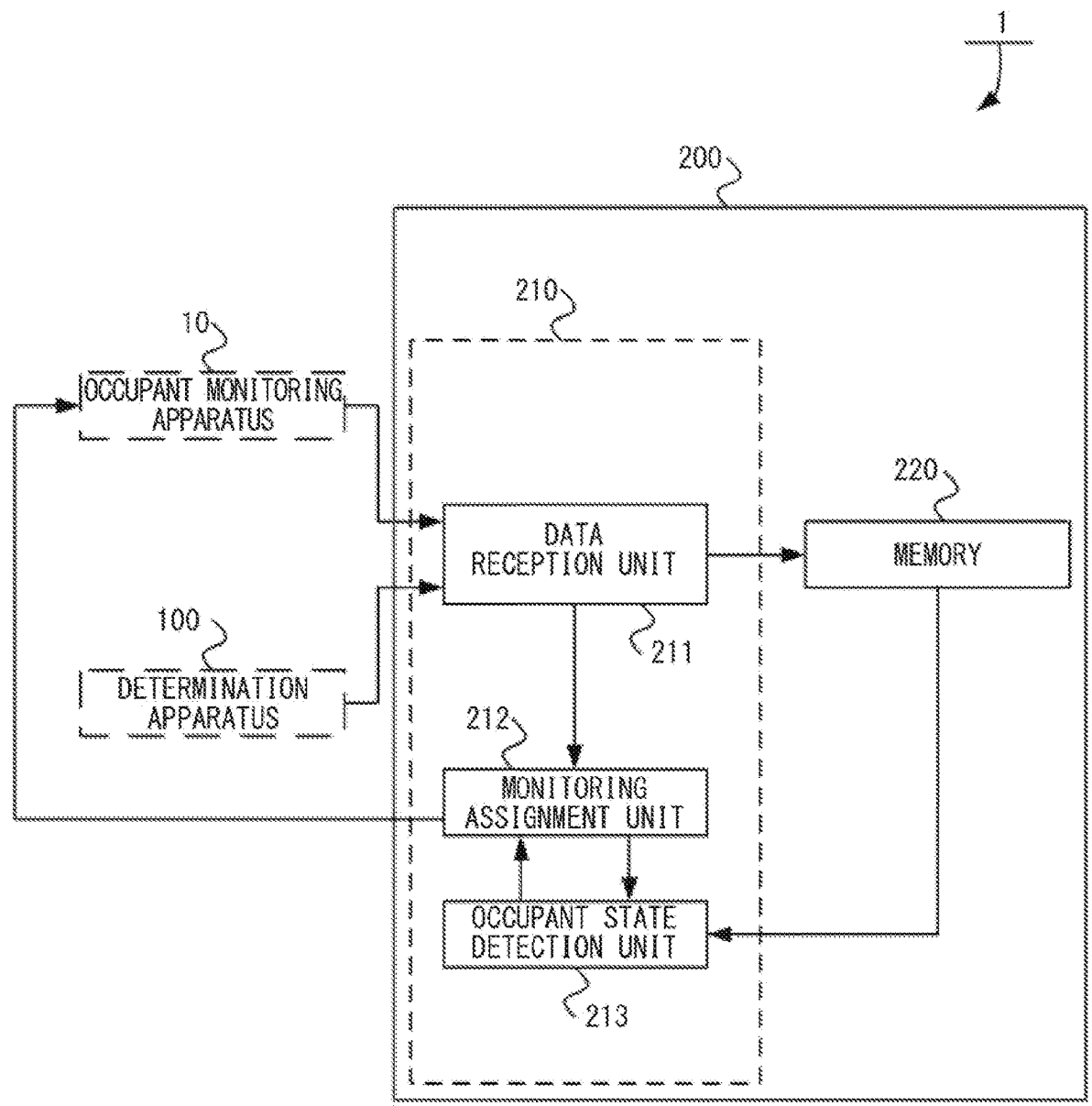
FIG. 2 is a block diagram illustrating a configuration of an occupant state detection apparatus in the occupant state detection system according to the first embodiment of the disclosure.

As illustrated in FIG. 2, the occupant state detection apparatus 200 according to this embodiment may include, without limitation, a processor 210 and a memory 220.

The processor 210 is configured to cooperate with one or more control programs included in the memory 220 described later, to control an entirety of the occupant state detection apparatus 200.

In this embodiment, for example, the processor 210 is configured to serve as, for example, a data reception unit 211, a monitoring assignment unit 212, and an occupant state detection unit 213 described later.

The memory 220 may include, without limitation, a ROM (Read Only Memory) and/or a RAM (Random Access Memory). The ROM may store, for example, the control program as mentioned above. The RAM may store, for example, various data.

In this embodiment, for example, the occupant monitoring data and other pieces of data received from the occupant monitoring apparatus 10 may be stored in the RAM.

<Configuration of Processor 210>

As illustrated in FIG. 2, the processor 210 according to this embodiment may include, without limitation, the data reception unit 211, the monitoring assignment unit 212, and the occupant state detection unit 213.

The data reception unit 211 may receive, from the determination apparatus 100, data indicating that the vehicle is in the traveling state, or the data indicating that the vehicle is in the stopped state.

In a case where the data reception unit 211 receives the data indicating that the vehicle is in the stopped state from the determination apparatus 100, the data reception unit 211 may transmit the relevant data to the monitoring assignment unit 212 described later.

Moreover, the data reception unit 211 may receive the occupant monitoring data from the occupant monitoring apparatus 10, and store the received occupant monitoring data in the memory 220.

The monitoring assignment unit 212 may receive a determination result by the determination apparatus 100 from the data reception unit 211. Furthermore, the monitoring assignment unit 212 may receive data regarding the sleeping state of an occupant from the occupant state detection unit 213 described later, and make the assignment of the part to be monitored and the data to be acquired, of the occupant in the vehicle, to be monitored by the occupant monitoring apparatus 10.

In one example, as summarized in FIG. 3, in a case where the monitoring assignment unit 212 has received the data indicating that the vehicle is in the stopped state from the data reception unit 211, and the monitoring assignment unit 212 has further received data indicating that an occupant is not in the sleeping state from the occupant state detection unit 213, the monitoring assignment unit 212 may assign "face" to the part to be monitored by the occupant monitoring apparatus 10, and assign "expression" to the data to be acquired by the occupant monitoring apparatus 10 (assignment processing A).

In a case where the monitoring assignment unit 212 has received the data indicating that the vehicle is in the stopped state from the data reception unit 211, and the monitoring assignment unit 212 has further received data indicating that an occupant is in the sleeping state, the monitoring assignment unit 212 may assign "whole body" to the part to be monitored by the occupant monitoring apparatus 10, and assign "behavior" to the data to be acquired by the occupant monitoring apparatus 10 (assignment processing B).

The occupant state detection unit 213 is configured to detect the physical state of the occupant on the basis of the occupant monitoring data from the occupant monitoring apparatus 10 stored in the memory 220.

In one example, as summarized in FIG. 3, the occupant state detection unit 213 may detect, for example, the sleeping state and a fatigue state of an occupant in the vehicle on the basis of the occupant monitoring data to be obtained in a case where the assignment processing A is carried out, i.e., data regarding "expression" of the occupant, e.g., "gaze direction, facial pose, eye aperture, number of blinks, and eye movement".

In other words, in the case where "face" is assigned to the part to be monitored by the occupant monitoring apparatus 10, the occupant state detection unit 213 may detect in real time, for example, the occupant dozing and/or the gaze direction of the occupant while the vehicle is stopped.

Thus, the occupant state detection unit 213 may continuously carry out detection processing based on the occupant monitoring data including a quick motion such as the eye movement and the blinks of the occupant.

Moreover, the occupant state detection unit 213 may detect, for example, the resting state and quality of sleep of an occupant in the vehicle on the basis of the occupant monitoring data to be obtained in a case where the assignment processing B is carried out, i.e., data regarding "behavior" of the occupant, e.g., "posture, body motion, sleeping time, number of times occupant turns over during their sleep, and resting time".

Thus, the occupant state detection unit 213 may continuously carry out low-load detection processing based on the occupant monitoring data including a slow motion such as turning over of the occupant during their sleep and the body motion of the occupant, unlike monitoring processing with respect to "face".

<Processing in Occupant State Detection System 1>

Figure 4:
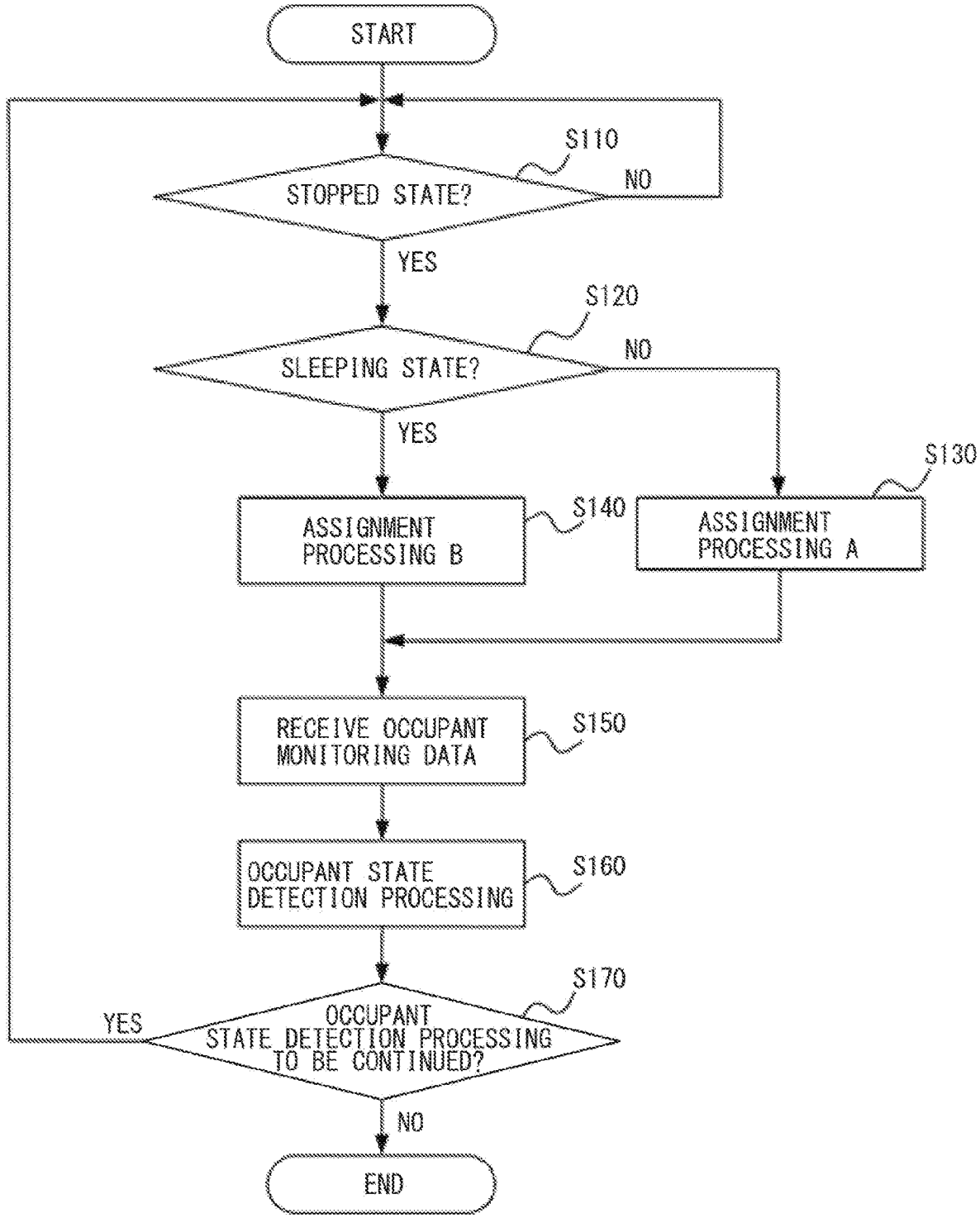
FIG. 4 is a flowchart of processing in the occupant state detection system according to the first embodiment of the disclosure.

Processing in the occupant state detection system 1 according to this embodiment is described with reference to FIG. 4.

The monitoring assignment unit 212 of the processor 210 may determine whether or not the monitoring assignment unit 212 has received the data indicating that the vehicle is in the stopped state, or that the ignition is in the OFF state, from the determination apparatus 100 through the data reception unit 211 (step S110).

In a case where the monitoring assignment unit 212 determines that the monitoring assignment unit 212 has not received the data indicating that the vehicle is in the stopped state, or that the ignition is in the OFF state ("NO" in step S110), the monitoring assignment unit 212 may cause the processing to return to step S110 and shift to a standby state.

In the standby state, for example, the monitoring assignment unit 212 may continuously carry out occupant state detection processing to be usually performed in a case where the vehicle is in the traveling state.

In a case where the monitoring assignment unit 212 determines that the monitoring assignment unit 212 has received the data indicating that the vehicle is in the stopped state, or that the ignition is in the OFF state ("YES" in step S110), the monitoring assignment unit 212 may cause the processing to proceed to step S120.

The monitoring assignment unit 212 of the processor 210 may determine whether or not the monitoring assignment unit 212 has received the data indicating that the occupant is in the sleeping state, from the occupant state detection unit 213 (step S120).

In a case where the monitoring assignment unit 212 determines that the monitoring assignment unit 212 has received the data indicating that the occupant is in the sleeping state ("YES" in step S120), the monitoring assignment unit 212 may cause the processing to proceed to step S140.

In a case where the monitoring assignment unit 212 determines that the monitoring assignment unit 212 has not received the data indicating that the occupant is in the sleeping state ("NO" in step S120), the monitoring assignment unit 212 may cause the processing to proceed to step S130.

In the case where the monitoring assignment unit 212 determines that the monitoring assignment unit 212 has not received the data indicating that the occupant is in the sleeping state ("NO" in step S120), the monitoring assignment unit 212 of the processor 210 may carry out the assignment processing A (step S130) and cause the processing to proceed to step S150.

As mentioned above, in the assignment processing A (step S130), the monitoring assignment unit 212 may carry out processing of assigning "face" to the part to be monitored by the occupant monitoring apparatus 10, assigning "expression" to the data to be acquired by the occupant monitoring apparatus 10, and transmitting a signal of such assignment to the occupant monitoring apparatus 10.

In the case where the monitoring assignment unit 212 determines that the monitoring assignment unit 212 has received the data indicating that the occupant is in the sleeping state ("YES" in step S120), the monitoring assignment unit 212 of the processor 210 may carry out the assignment processing B (step S140) and may cause the processing to proceed to step S150.

As mentioned above, in the assignment processing B (step S140), the monitoring assignment unit 212 may carry out processing of assigning "whole body" to the part to be monitored, of the occupant in the vehicle, to be monitored by the occupant monitoring apparatus 10, assigning "behavior" to the data to be acquired by the occupant monitoring apparatus 10, and transmitting a signal of such assignment to the occupant monitoring apparatus 10.

Here, after the assignment processing A (step S130) or the assignment processing B (step S140) in the monitoring assignment unit 212 is carried out, the processor 210 may permit the occupant monitoring apparatus 10 that has been already started up to output data to the data reception unit 211.

Alternatively, after the assignment processing A (step S130) or the assignment processing B (step S140) in the monitoring assignment unit 212 is carried out, the processor 210 may permit the data reception unit 211 to receive the occupant monitoring data from the occupant monitoring apparatus 10.

In another alternative, after the assignment processing A (step S130) or the assignment processing B (step S140) in the monitoring assignment unit 212 is carried out, the processor 210 may permit the data reception unit 211 to write, to the memory 220, the occupant monitoring data from the occupant monitoring apparatus 10.

The data reception unit 211 may receive the occupant monitoring data from the occupant monitoring apparatus 10 (step S150).

The data reception unit 211 may store the occupant monitoring data received from the occupant monitoring apparatus 10, in the memory 220 (step S150).

The occupant state detection unit 213 may detect, for example, the physical state of the occupant on the basis of the occupant monitoring data from the occupant monitoring apparatus 10 stored in the memory 220 (step S160).

In the case with the assignment processing A (step S130) in which "face" is assigned to the part to be monitored by the occupant monitoring apparatus 10 and "expression" is assigned to the data to be acquired by the occupant monitoring apparatus 10, the occupant state detection unit 213 may detect, for example, the states of the occupant, e.g., dozing and the gaze direction, while the vehicle is stopped.

In the case with the assignment processing B (step S140) in which "whole body" is assigned to the part to be monitored by the occupant monitoring apparatus 10 and "behavior" is assigned to the data to be acquired by the occupant monitoring apparatus 10, the occupant state detection unit 213 may detect, for example, the sleeping state and the quality of sleep of the occupant while the vehicle is stopped.

The processor 210 may determine whether or not to continue the occupant state detection processing (step S170).

In a case where the processor 210 determines that the occupant state detection processing is to be continued ("YES" in step S170), the processor 210 may cause the processing to return to step S110, and continue the occupant state detection processing.

In a case where the processor 210 determines that the occupant state detection processing is not to be continued ("NO" in step S170), the processor 210 may end the occupant state detection processing.

<Workings and Effects>

As described above, the occupant state detection system 1 according to this embodiment includes the occupant monitoring apparatus 10, the occupant state detection apparatus 200, and the determination apparatus 100. The occupant monitoring apparatus 10 is configured to monitor the physical state of the occupant in the vehicle. The occupant state detection apparatus 200 is configured to detect the physical state of the occupant in the vehicle on the basis of the occupant monitoring data from the occupant monitoring apparatus 10. The determination apparatus 100 is configured to determine whether the vehicle is in the traveling state or the stopped state. The occupant state detection apparatus 200 includes the processor 210 and the memory 220. The memory 220 is configured to be communicably coupled to the processor 210. The data reception unit 211 of the processor 210 is configured to: receive the occupant monitoring data and determination data from the determination apparatus 100; and store the received occupant monitoring data and the received determination data in the memory 220. On the basis of the determination data, the monitoring assignment unit 212 of the processor 210 is configured to make the assignment of the part to be monitored, of the occupant in the vehicle, to be monitored by the occupant monitoring apparatus 10, to detect the physical state of the occupant in the vehicle.

That is, in the occupant state detection system 1, the physical state of the occupant in the vehicle is detected with the use of the occupant monitoring apparatus 10 provided with the assignment of the part to be monitored and the data to be acquired, of the occupant in the vehicle, on the basis of the determination data regarding the vehicle.

This leads to optimization of a monitoring method in the stopped state in the detection of the physical state of the occupant. Hence, it is possible to accurately detect the physical state of the occupant.

Moreover, in the occupant state detection system 1 according to this embodiment, the determination apparatus 100 may acquire the ignition data. In the case where the ignition is in the OFF state, the determination apparatus 100 may transmit the data indicating that the vehicle is in the stopped state, to the processor 210.

In other words, the determination apparatus 100 may determine whether the vehicle is in the traveling state or the stopped state on the basis of whether the ignition is in the ON state or the OFF state.

Hence, it is possible for the occupant state detection system 1 to determine uniquely whether the vehicle is in the traveling state or the stopped state, without using a special sensor, etc.

Furthermore, in the occupant state detection system 1 according to this embodiment, the occupant monitoring apparatus 10 may include the camera configured to capture the image of the occupant in the vehicle. The occupant monitoring apparatus 10 may acquire the occupant monitoring data including the behavior and the expression of the occupant in the vehicle, and transmit the occupant monitoring data to the processor 210.

That is, in the occupant state detection system 1, the occupant monitoring apparatus 10 is allowed to acquire the occupant monitoring data in consideration of characteristics of the built-in camera, to detect the physical state of the occupant. The occupant monitoring data includes the behavior and the expression of the occupant in the vehicle.

This makes it possible for the occupant state detection system 1 to obtain highly accurate data regarding, for example, the behavior and the expression of the occupant in the vehicle. Hence, it is possible to enhance accuracy of the detection of the physical state of the occupant in the vehicle.

In addition, in the case with the camera including both the optical camera and the near-infrared camera, it is possible to capture the image of the occupant day and night.

Hence, it is possible to grasp accurately the physical state of the occupant in the stopped state of the vehicle at any time.

In addition, in the occupant state detection system 1 according to this embodiment, in the case where the processor 210 determines, on the basis of the occupant monitoring data, that the occupant is in the sleeping state, with the determination data indicating that the vehicle is in the stopped state, the processor 210 may assign "whole body" of the occupant in the vehicle to the part to be monitored, to detect the physical state of the occupant.

That is, in the case where the determination data indicates that the vehicle is in the stopped state and the processor 210 determines that the occupant is in the sleeping state, the processor 210 may assign "whole body" of the occupant to the part to be monitored, of the occupant in the vehicle, to detect the physical state of the occupant.

Thus, assigning "whole body" of the occupant to the part to be monitored, of the occupant in the vehicle, makes it possible to lower a processing load on the processor 210. Hence, it is possible to lower power consumption of the processor 210.

Moreover, it is possible for the processor 210 to use resource by which the processing load on the processor 210 is lowered, for processing such as new detection.

Furthermore, in the occupant state detection system 1 according to this embodiment, in the case where the processor 210 determines, on the basis of the occupant monitoring data, that the occupant is in the sleeping state, with the determination data indicating that the vehicle is in the stopped state, the processor 210 may assign other parts than the face of the occupant in the vehicle to the part to be monitored, to detect the physical state of the occupant.

That is, in the case where the determination data indicates that the vehicle is in the stopped state and the processor 210 determines that the occupant is in the sleeping state, the processor 210 may assign "whole body" of the occupant to the part to be monitored, of the occupant in the vehicle, to detect the physical state of the occupant.

Thus, assigning "whole body" of the occupant to the part to be monitored, of the occupant in the vehicle, makes it possible to lower the processing load on the processor 210. Hence, it is possible to lower the power consumption of the processor 210.

Moreover, it is possible for the processor 210 to use resource by which the processing load on the processor 210 is lowered, for processing such as new detection.

Second Embodiment

Figure 7:
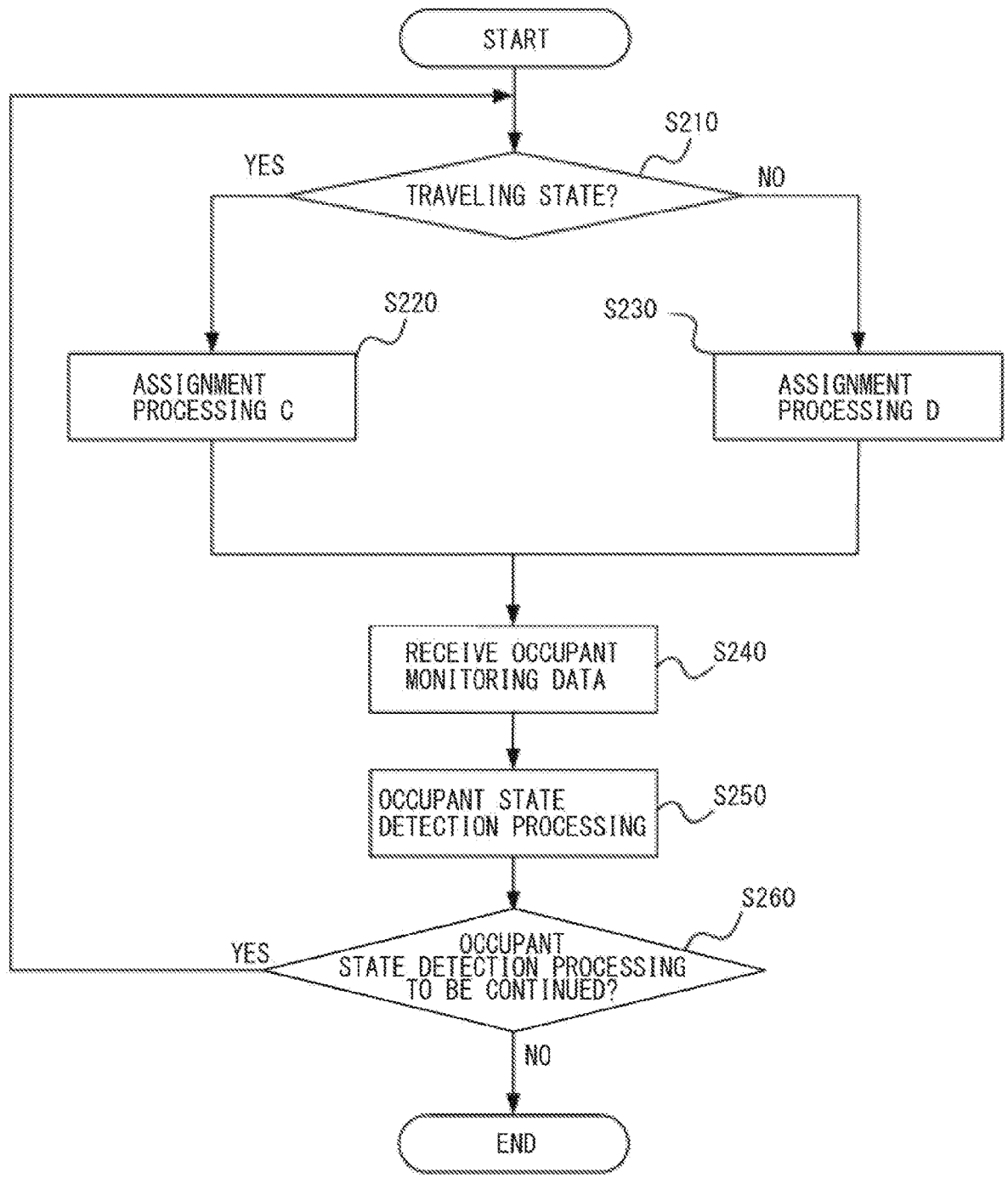
FIG. 7 is a flowchart of processing in the occupant state detection system according to the second embodiment of the disclosure.

An occupant state detection system 1A according to a second embodiment is described with reference to FIGS. 5 to 7.

<Configuration of Occupant State Detection System 1A>

Figure 5:
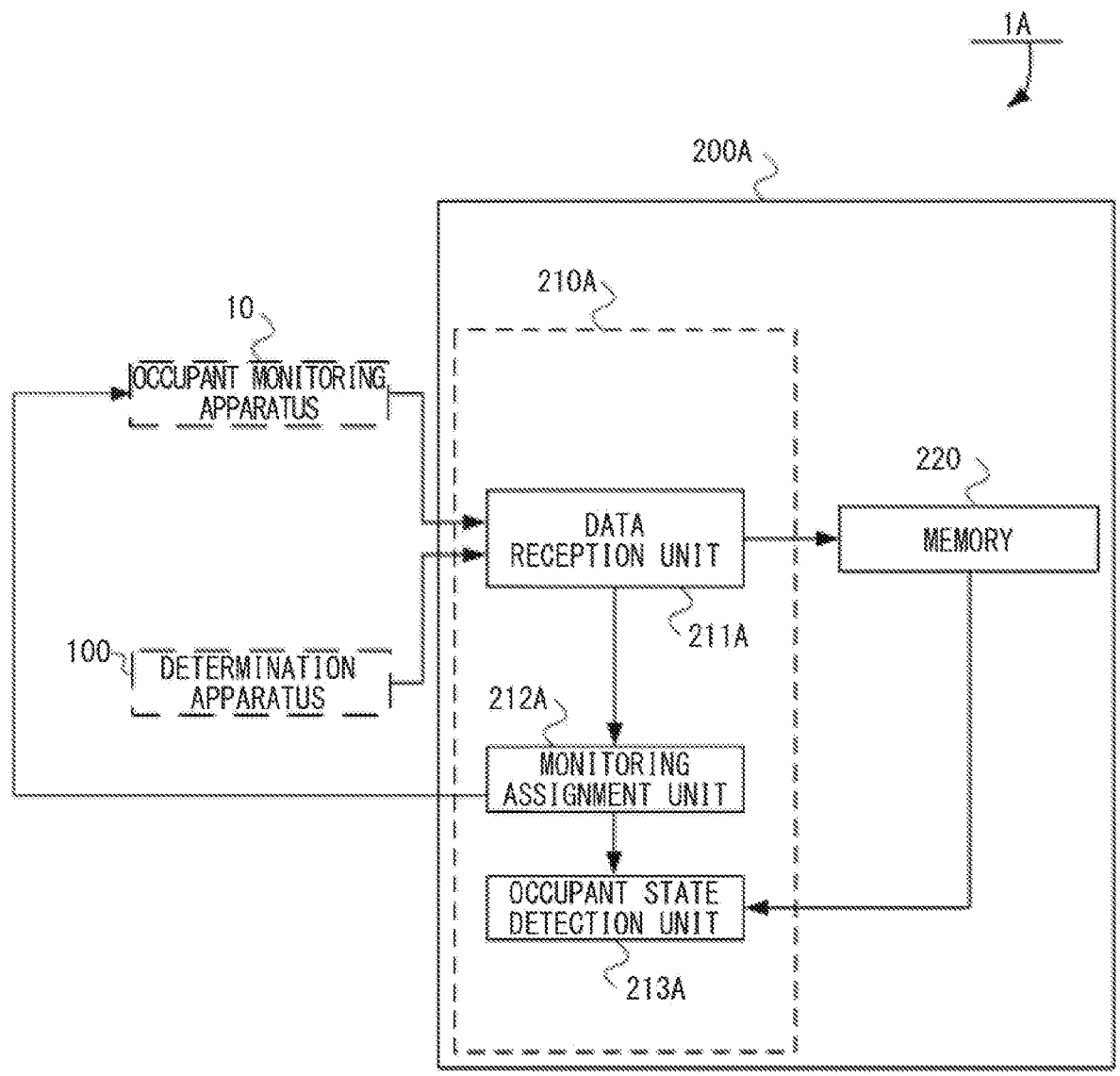
FIG. 5 is a block diagram illustrating a configuration of an occupant state detection system according to a second embodiment of the disclosure.

As illustrated in FIG. 5, the occupant state detection system 1A according to this embodiment may include, without limitation, the occupant monitoring apparatus 10, the determination apparatus 100, and an occupant state detection apparatus 200A.

It is to be noted that constituent elements denoted by the same reference characters as those of the first embodiment have similar functions, and therefore detailed description thereof is omitted.

<Configuration of Occupant State Detection Apparatus 200A>

As illustrated in FIG. 5, the occupant state detection apparatus 200A may include, without limitation, a processor 210A and the memory 220.

The occupant state detection apparatus 200A may make the assignment of the part to be monitored and the data to be acquired, of the occupant in the vehicle, to be monitored by the occupant monitoring apparatus 10 in a case where the occupant state detection apparatus 200A has received the data indicating that the vehicle is in the stopped state from the determination apparatus 100.

It is to be noted that details of assignment processing of the part to be monitored and the data to be acquired are described later. The assignment processing is to be carried out by the occupant state detection apparatus 200A.

The occupant state detection apparatus 200A may receive the occupant monitoring data from the occupant monitoring apparatus 10.

On the basis of the occupant monitoring data from the occupant monitoring apparatus 10, the occupant state detection apparatus 200A may detect the physical state of the occupant.

<Configuration of Processor 210A>

As illustrated in FIG. 5, the processor 210A may include, without limitation, a data reception unit 211A, a monitoring assignment unit 212A, and an occupant state detection unit 213A.

The data reception unit 211A may store the occupant monitoring data received from the occupant monitoring apparatus 10, in the memory 220.

The monitoring assignment unit 212A may make the assignment of the part to be monitored and the data to be acquired, of the occupant in the vehicle, to be monitored by the occupant monitoring apparatus 10, in a case where the monitoring assignment unit 212A has received the data indicating that the vehicle is in the traveling state from the data reception unit 211A.

In one example, as summarized in FIG. 6, in a case where the monitoring assignment unit 212A has received the data indicating that the vehicle is in the traveling state from the data reception unit 211A, the monitoring assignment unit 212A may assign "face" to the part to be monitored by the occupant monitoring apparatus 10, and assign "expression" to the data to be acquired by the occupant monitoring apparatus 10 (assignment processing C).

In a case where the monitoring assignment unit 212A has received the data indicating that the vehicle is in the stopped state from the data reception unit 211A, the monitoring assignment unit 212A may assign "whole body" to the part to be monitored by the occupant monitoring apparatus 10, and assign "behavior" to the data to be acquired by the occupant monitoring apparatus 10 (assignment processing D).

The occupant state detection unit 213A is configured to detect the physical state of the occupant on the basis of the occupant monitoring data from the occupant monitoring apparatus 10 stored in the memory 220.

In one example, as summarized in FIG. 6, the occupant state detection unit 213A may detect, for example, the occupant dozing, being fatigued, and/or looking aside on the basis of the occupant monitoring data to be obtained in a case where the assignment processing C is carried out, i.e., data regarding "expression" of the occupant, e.g., "gaze direction, facial pose, eye aperture, number of blinks, and eye movement".

In other words, in the case where "face" is assigned to the part to be monitored by the occupant monitoring apparatus 10, the occupant state detection unit 213A may detect in real time, for example, the occupant dozing while driving the vehicle.

Thus, the occupant state detection unit 213A may continuously carry out the detection processing based on the occupant monitoring data including the quick motion such as the eye movement and the blinks of the occupant.

Moreover, the occupant state detection unit 213A may detect, for example, the resting state, the sleeping state, and the quality of sleep of the occupant in the vehicle on the basis of the occupant monitoring data to be obtained in a case where the assignment processing D is carried out, i.e., data regarding "behavior" of the occupant, e.g., "posture, body motion, sleeping time, number of times occupant turns over during their sleep, and resting time".

Thus, in the case where "whole body" is assigned to the part to be monitored by the occupant monitoring apparatus 10, the occupant state detection unit 213A is configured to carry out the low-load detection processing based on the occupant monitoring data including the slow motion such as the turning over of the occupant during their sleep and the body motion of the occupant, unlike the case where "face" is monitored.

<Processing in Occupant State Detection System 1A>

Processing in the occupant state detection system 1A according to this embodiment is described with reference to FIG. 7.

The monitoring assignment unit 212A of the processor 210A may determine whether or not the monitoring assignment unit 212A has received the data indicating that the vehicle is in the traveling state, or that the ignition is in the ON state, from the determination apparatus 100 through the data reception unit 211A (step S210).

In a case where the monitoring assignment unit 212A determines that the monitoring assignment unit 212A has received the data indicating that the vehicle is in the traveling state, or that the ignition is in the ON state ("YES" in step S210), the monitoring assignment unit 212A may cause the processing to proceed to step S220 and carry out the assignment processing C (step S220).

As mentioned above, in the assignment processing C, the monitoring assignment unit 212A may assign "face" to the part to be monitored by the occupant monitoring apparatus 10, and assign "expression" to the data to be acquired by the occupant monitoring apparatus 10.

In a case where the monitoring assignment unit 212A of the processor 210A determines that the monitoring assignment unit 212A has received the data indicating that the vehicle is in the stopped state, or that the ignition is in the OFF state ("NO" in step S210), the monitoring assignment unit 212A may cause the processing to proceed to step S230, and carry out the assignment processing D (step S230).

As mentioned above, in the assignment processing D, the monitoring assignment unit 212A may assign "whole body" to the part to be monitored by the occupant monitoring apparatus 10, and assign "behavior" to the data to be acquired by the occupant monitoring apparatus 10.

The data reception unit 211A may receive the occupant monitoring data from the occupant monitoring apparatus 10 (step S240).

Thereafter, the data reception unit 211A may store the occupant monitoring data received from the occupant monitoring apparatus 10, in the memory 220 (step S240).

The occupant state detection unit 213A may detect, for example, the physical state of the occupant on the basis of the occupant monitoring data from the occupant monitoring apparatus 10 stored in the memory 220 (step S250).

In the case with the assignment processing C (step S220) in which "face" is assigned to the part to be monitored by the occupant monitoring apparatus 10, and "expression" is assigned to the data to be acquired by the occupant monitoring apparatus 10, the occupant state detection unit 213A may detect, for example, the occupant dozing, being fatigued, and/or looking aside while the vehicle is traveling.

In the case with the assignment processing D (step S230) in which "whole body" is assigned to the part to be monitored by the occupant monitoring apparatus 10, and "behavior" is assigned to the data to be acquired by the occupant monitoring apparatus 10, the occupant state detection unit 213A may detect, for example, the resting state, the sleeping state, and/or the quality of sleep of the occupant while the vehicle is stopped.

The processor 210A may determine whether or not to continue the occupant state detection processing (step S260).

In a case where the processor 210A determines that the occupant state detection processing is to be continued ("YES" in step S260), the processor 210A may cause the processing to return to step S210, and continue the occupant state detection processing.

In a case where the processor 210A determines that the occupant state detection processing is not to be continued ("NO" in step S260), the processor 210A may end the occupant state detection processing.

<Workings and Effects>

As described above, in the occupant state detection system 1A according to this embodiment, in the case with the determination data indicating that the vehicle is in the traveling state, the processor 210A may assign the face of the occupant in the vehicle to the part to be monitored. In the case with the determination data indicating that the vehicle is in the stopped state, the processor 210A may assign the whole body of the occupant in the vehicle to the part to be monitored. Thus, the processor 210A may detect the physical state of the occupant in the vehicle.

That is, in the occupant state detection system 1A, the physical state of the occupant in the vehicle is detected with the use of the occupant monitoring apparatus 10 provided with the assignment of the part to be monitored and the data to be acquired, of the occupant in the vehicle, on the basis of the determination data regarding the vehicle.

This leads to the optimization of the monitoring method in the traveling state of the vehicle and the monitoring method in the stopped state of the vehicle in the detection of the physical state of the occupant. Hence, it is possible to accurately detect the physical state of the occupant.

Moreover, in the case where the vehicle is in the stopped state, "whole body" of the occupant may be assigned to the part to be monitored, of the occupant in the vehicle. This makes it possible to lower a processing load on the processor 210A, leading to reduction in power consumption of the processor 210A.

Furthermore, it is possible for the processor 210A to use resource by which the processing load on the processor 210A is lowered, for processing such as new detection.

Third Embodiment

Figure 10:
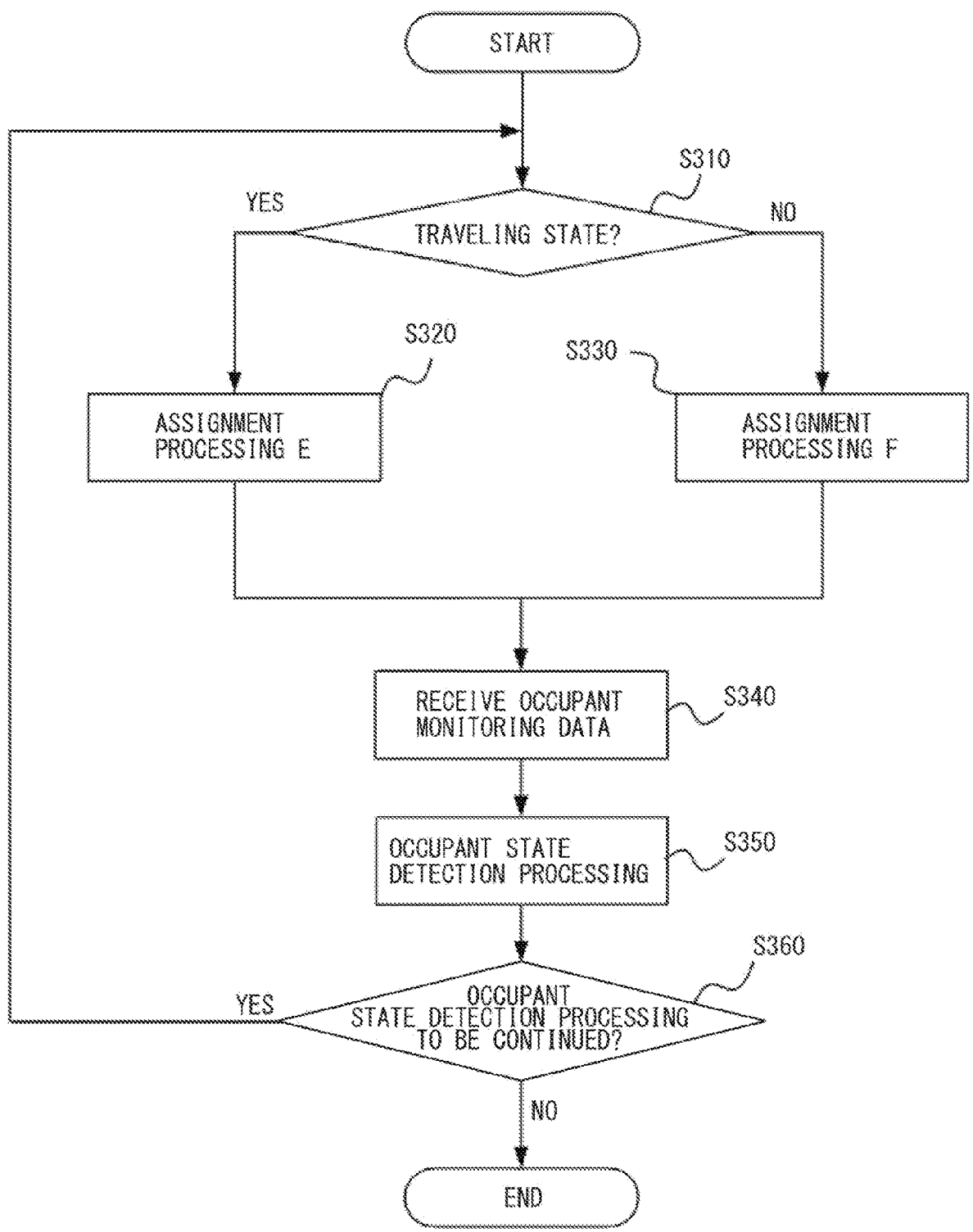
FIG. 10 is a flowchart of processing in the occupant state detection system according to the third embodiment of the disclosure.

An occupant state detection system 1B according to a third embodiment is described with reference to FIGS. 8 to 10.

<Configuration of Occupant State Detection System 1B>

Figure 8:
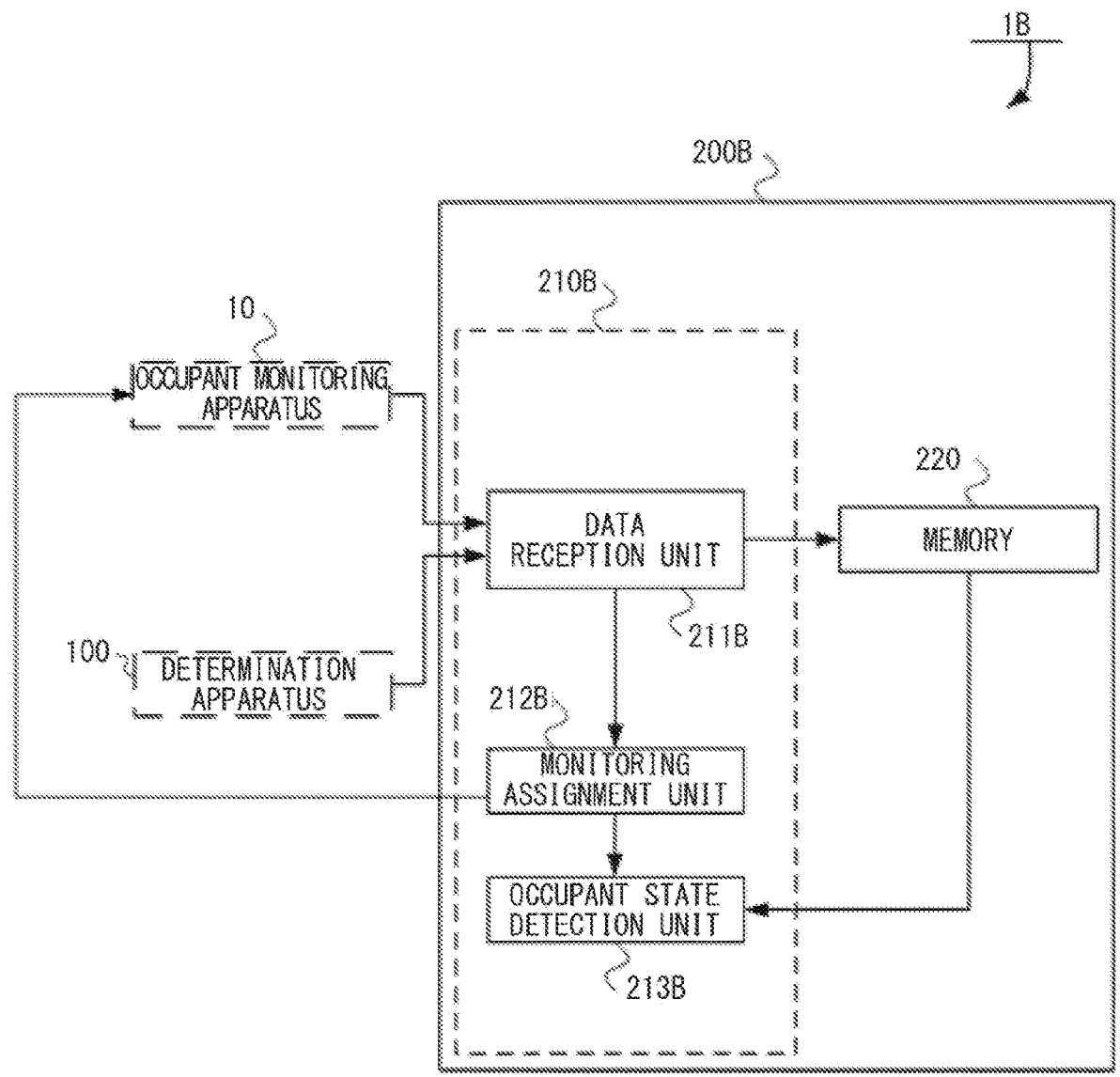
FIG. 8 is a block diagram illustrating a configuration of an occupant state detection system according to a third embodiment of the disclosure.

As illustrated in FIG. 8, the occupant state detection system 1B according to this embodiment may include, without limitation, the occupant monitoring apparatus 10, the determination apparatus 100, and an occupant state detection apparatus 200B.

The occupant state detection apparatus 200B may make the assignment of the part to be monitored and the data to be acquired, of the occupant in the vehicle, to be monitored by the occupant monitoring apparatus 10 in a case where the occupant state detection apparatus 200B has received the data indicating that the vehicle is in the stopped state from the determination apparatus 100.

It is to be noted that details of assignment processing of the part to be monitored and the data to be acquired are described later. The assignment processing is to be carried out by the occupant state detection apparatus 200B.

The occupant state detection apparatus 200B may receive the occupant monitoring data from the occupant monitoring apparatus 10.

On the basis of the occupant monitoring data from the occupant monitoring apparatus 10, the occupant state detection apparatus 200B may detect the physical state of the occupant.

<Configuration of Processor 210B>

As illustrated in FIG. 8, the processor 210B may include, without limitation, a data reception unit 211B, a monitoring assignment unit 212B, and an occupant state detection unit 213B.

The data reception unit 211B may store the occupant monitoring data received from the occupant monitoring apparatus 10, in the memory 220.

The monitoring assignment unit 212B may make the assignment of the part to be monitored and the data to be acquired, of the occupant in the vehicle, to be monitored by the occupant monitoring apparatus 10, in a case where the monitoring assignment unit 212B has received the data indicating that the vehicle is in the traveling state from the data reception unit 211B.

In one example, as summarized in FIG. 9, in the case where the monitoring assignment unit 212B has received the data indicating that the vehicle is in the traveling state from the data reception unit 211B, the monitoring assignment unit 212B may assign, for example, "driver" to the part to be monitored by the occupant monitoring apparatus 10, and assign "expression" to the data to be acquired by the occupant monitoring apparatus 10 (assignment processing E).

In a case where the monitoring assignment unit 212B has received the data indicating that the vehicle is in the stopped state from the data reception unit 211B, the monitoring assignment unit 212B may assign "every occupant" to the part to be monitored by the occupant monitoring apparatus 10, and assign "behavior" to the data to be acquired by the occupant monitoring apparatus 10 (assignment processing F).

The occupant state detection unit 213B is configured to detect the physical state of the occupant on the basis of the occupant monitoring data from the occupant monitoring apparatus 10 stored in the memory 220.

In one example, as summarized in FIG. 9, the occupant state detection unit 213B may detect, for example, the driver of the vehicle dozing, being fatigued, and/or looking aside, on the basis of the occupant monitoring data to be obtained in a case where the assignment processing E is carried out, i.e., the data regarding "expression" of the occupant, e.g., "gaze direction, facial pose, eye aperture, number of blinks, and eye movement".

That is, in the case where "driver" is assigned to the part to be monitored by the occupant monitoring apparatus 10, the occupant state detection unit 213B may detect in real time, for example, the driver dozing or looking aside while driving the vehicle.

Thus, the occupant state detection unit 213B may continuously carry out the detection processing based on the occupant monitoring data including the quick motion such as the eye movement and the blinks of the driver.

Moreover, the occupant state detection unit 213B may detect, for example, the resting state, the sleeping state, and the quality of sleep of every occupant in the vehicle on the basis of the occupant monitoring data to be obtained in a case where the assignment processing F is carried out, i.e., the data regarding "behavior" of the occupant, e.g., "posture, body motion, sleeping time, number of times occupant turns over during their sleep, and resting time".

Thus, in the case where "every occupant" is assigned to the part to be monitored by the occupant monitoring apparatus 10, the occupant state detection unit 213B is configured to carry out the low-load detection processing based on the occupant monitoring data including the slow motion such as the turning over of the occupant during their sleep and the body motion of the occupant, unlike the case where "driver" is monitored.

<Processing in Occupant State Detection System 1B>

Processing in the occupant state detection system 1B according to this embodiment is described with reference to FIG. 10.

The monitoring assignment unit 212B of the processor 210B may determine whether or not the monitoring assignment unit 212B has received the data indicating that the vehicle is in the traveling state, or that the ignition is in the ON state, from the determination apparatus 100 through the data reception unit 211B (step S310).

In a case where the monitoring assignment unit 212B determines that the monitoring assignment unit 212B has received the data indicating that the vehicle is in the traveling state, or that the ignition is in the ON state ("YES" in step S310), the monitoring assignment unit 212B may cause the processing to proceed to step S320 and carry out the assignment processing E (step S320).

As mentioned above, in the assignment processing E (step S320), the monitoring assignment unit 212B may carry out processing of assigning "driver" to the part to be monitored by the occupant monitoring apparatus 10, assigning "expression" to the data to be acquired by the occupant monitoring apparatus 10, and transmitting a signal of such assignment to the occupant monitoring apparatus 10.

In a case where the monitoring assignment unit 212B of the processor 210B determines that the monitoring assignment unit 212B has received the data indicating that the vehicle is in the stopped state, or that the ignition is in the OFF state ("NO" in step S310), the monitoring assignment unit 212B may cause the processing to proceed to step S330 and carry out the assignment processing F (step S330).

As mentioned above, in the assignment processing F (step S330), the monitoring assignment unit 212B may carry out processing of assigning "every occupant" to the part to be monitored by the occupant monitoring apparatus 10, assigning "behavior" to the data acquired by the occupant monitoring apparatus 10, and transmitting a signal of such assignment to the occupant monitoring apparatus 10.

The data reception unit 211B may receive the occupant monitoring data from the occupant monitoring apparatus 10 (step S340).

The data reception unit 211B may store the occupant monitoring data received from the occupant monitoring apparatus 10, in the memory 220 (step S340).

The occupant state detection unit 213B may detect the physical state of the occupant on the basis of the occupant monitoring data from the occupant monitoring apparatus 10 stored in the memory 220 (step S350).

In the case with the assignment processing E (step S320) in which "driver" is assigned to the part to be monitored by the occupant monitoring apparatus 10, and "expression" is assigned to the data to be acquired by the occupant monitoring apparatus 10, the occupant state detection unit 213B may detect, for example, the driver dozing, being fatigued, and/or looking aside while the vehicle is traveling.

In the case with the assignment processing F (step S330) in which "every occupant" is assigned to the part to be monitored by the occupant monitoring apparatus 10, and "behavior" is assigned to the data to be acquired by the occupant monitoring apparatus 10, the occupant state detection unit 213B may detect, for example, the resting state, the sleeping state, and/or the quality of sleep of every occupant while the vehicle is stopped.

The processor 210B may determine whether or not to continue the occupant state detection processing (step S360).

In a case where the processor 210B determines that the occupant state detection processing is to be continued ("YES" in step S360), the processor 210B may cause the processing to return to step S310, and continue the occupant state detection processing.

In a case where the processor 210B determines that the occupant state detection processing is not to be continued ("NO" in step S360), the processor 210B may end the occupant state detection processing.

<Workings and Effects>

As described above, in the occupant state detection system 1B according to this embodiment, the processor 210B may assign the driver of the vehicle to the part to be monitored, in the case with the determination data indicating that the vehicle is in the traveling state. The processor 210B may assign every occupant in the vehicle to the part to be monitored in the case with the determination data indicating that the vehicle is in the stopped state. Thus, the processor 210B may detect the physical state of the occupant in the vehicle.

That is, in the occupant state detection system 1B, the physical state of the occupant in the vehicle is detected with the use of the occupant monitoring apparatus 10 provided with the assignment of the part to be monitored and the data to be acquired, of the occupant in the vehicle, on the basis of the determination data regarding the vehicle.

This leads to the optimization of the monitoring method in the stopped state of the vehicle and the monitoring method in the traveling state of the vehicle in the detection of the physical state of the occupant. Hence, it is possible to accurately detect the physical state of the occupant.

Moreover, in the case where the vehicle is in the stopped state, "every occupant" may be assigned to the part to be monitored, of the occupant in the vehicle. This makes it possible to lower a processing load on the processor 210B, leading to reduction in power consumption of the processor 210B.

Furthermore, it is possible for the processor 210B to use resource by which the processing load on the processor 210B is lowered, for processing such as new detection.

Fourth Embodiment

Figure 13:
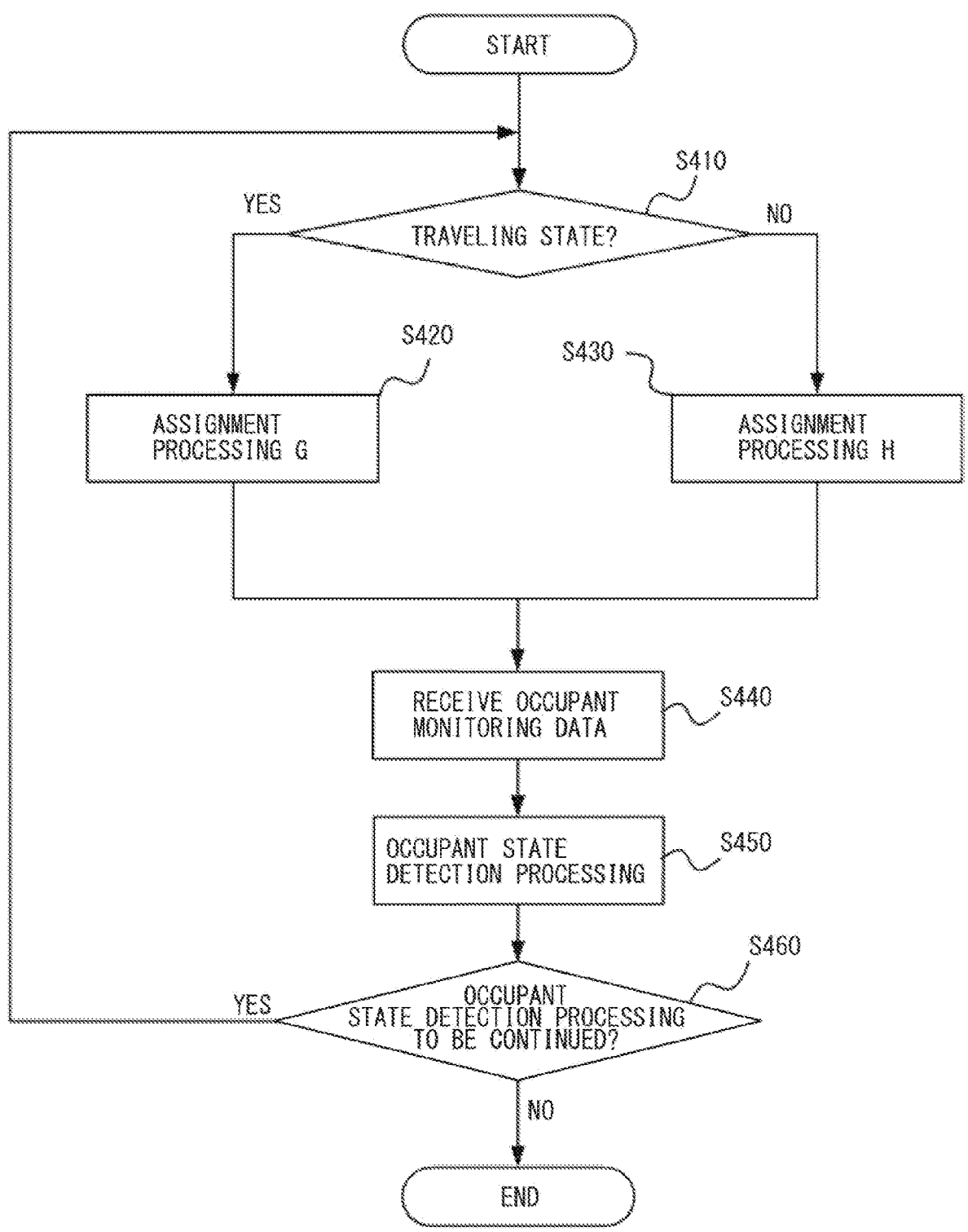
FIG. 13 is a flowchart of processing in the occupant state detection system according to the fourth embodiment of the disclosure.

An occupant state detection system 1C according to a fourth embodiment is described with reference to FIGS. 11 to 13.

<Configuration of Occupant State Detection System 1C>

Figure 11:
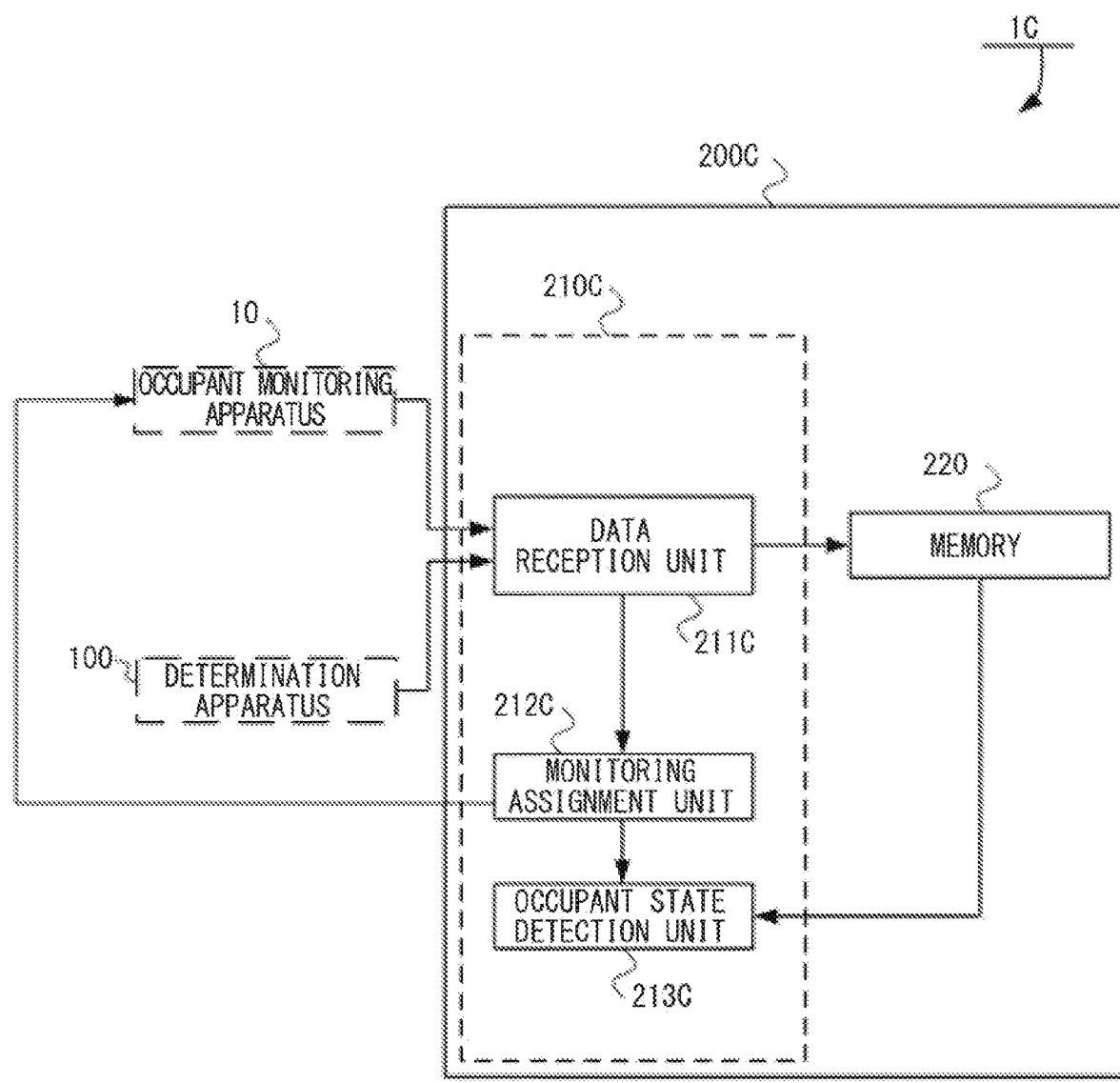
FIG. 11 is a block diagram illustrating a configuration of an occupant state detection system according to a fourth embodiment of the disclosure.

As illustrated in FIG. 11, the occupant state detection system 1C according to this embodiment may include, without limitation, the occupant monitoring apparatus 10, the determination apparatus 100, and an occupant state detection apparatus 200C.

The occupant state detection apparatus 200C may make the assignment of the part to be monitored, of the occupant in the vehicle, to be monitored by the occupant monitoring apparatus 10 in a case where the occupant state detection apparatus 200C has received the data indicating that the vehicle is in the stopped state from the determination apparatus 100.

It is to be noted that details of assignment processing of the part to be monitored are described later. The assignment processing is to be carried out by the occupant state detection apparatus 200C.

The occupant state detection apparatus 200C may receive the occupant monitoring data from the occupant monitoring apparatus 10.

On the basis of the occupant monitoring data from the occupant monitoring apparatus 10, the occupant state detection apparatus 200C may detect the physical state of the occupant.

<Configuration of Processor 210C>

As illustrated in FIG. 11, the processor 210C may include, without limitation, a data reception unit 211C, a monitoring assignment unit 212C, and an occupant state detection unit 213C.

The data reception unit 211C may store the occupant monitoring data received from the occupant monitoring apparatus 10, in the memory 220.

The monitoring assignment unit 212C may make the assignment of the part to be monitored, of the occupant in the vehicle, to be monitored by the occupant monitoring apparatus 10 in a case where the monitoring assignment unit 212C has received the data indicating that the vehicle is in the traveling state from the data reception unit 211C.

In one example, as summarized in FIG. 12, in the case where the monitoring assignment unit 212C has received the data indicating that the vehicle is in the traveling state from the data reception unit 211C, the monitoring assignment unit 212C may assign "face and whole body" to the part to be monitored by the occupant monitoring apparatus 10 (assignment processing G).

That is, in the case where the vehicle is in the traveling state, the monitoring assignment unit 212C may assign "face and whole body" to the part to be monitored by the occupant monitoring apparatus 10, to detect immediately, for example, the occupant taking an abnormal posture, dozing, and/or looking aside. Thus, the occupant monitoring data such as "gaze direction, facial pose, number of blinks, eye aperture, eye movement, posture, and body motion" may be transmitted to the data reception unit 211C.

Moreover, in a case where the monitoring assignment unit 212C has received the data indicating that the vehicle is in the stopped state from the data reception unit 211C, the monitoring assignment unit 212C may assign "part of face and whole body" to the part to be monitored by the occupant monitoring apparatus 10 (assignment processing H).

That is, in the case where the vehicle is in the stopped state, it is unnecessary to detect immediately a serious state of an occupant, e.g., dozing or looking aside. Thus, the monitoring assignment unit 212C may assign "part of face and whole body" to the part to be monitored by the occupant monitoring apparatus 10. The occupant monitoring data such as "facial pose, eye aperture, posture, and body motion" may be transmitted to the data reception unit 211C.

<Processing in Occupant State Detection System 1C>

Processing in the occupant state detection system 1C according to this embodiment is described with reference to FIG. 13.

The monitoring assignment unit 212C of the processor 210C may determine whether or not the monitoring assignment unit 212C has received the data indicating that the vehicle is in the traveling state, or that the ignition is in the ON state, from the determination apparatus 100 through the data reception unit 211C (step S410).

In a case where the monitoring assignment unit 212C determines that the monitoring assignment unit 212C has received the data indicating that the vehicle is in the traveling state, or that the ignition is in the ON state ("YES" in step S410), the monitoring assignment unit 212C may cause the processing to proceed to step S420, and carry out the assignment processing G (step S420).

As described above, in the assignment processing G (step S420), the monitoring assignment unit 212C may carry out processing of assigning "face and whole body" of the occupant to the part to be monitored by the occupant monitoring apparatus 10, and transmitting a signal of such assignment to the occupant monitoring apparatus 10.

In a case where the monitoring assignment unit 212C of the processor 210C determines that the monitoring assignment unit 212C has received the data indicating that the vehicle is in the stopped state, or that the ignition is in the OFF state ("NO" in step S410), the monitoring assignment unit 212C may cause the processing to proceed to step S430, and carry out the assignment processing H (step S430).

As described above, in the assignment processing H (step S430), the monitoring assignment unit 212C may carry out processing of assigning "part of face and whole body" to the part to be monitored by the occupant monitoring apparatus 10, and transmitting a signal of such assignment to the occupant monitoring apparatus 10.

The data reception unit 211C may receive the occupant monitoring data from the occupant monitoring apparatus 10 provided by the monitoring assignment unit 212C with the assignment of the part to be monitored and the data to be acquired, of the occupant in the vehicle (step S440).

The data reception unit 211C may store the occupant monitoring data received from the occupant monitoring apparatus 10, in the memory 220 (step S440).

The occupant state detection unit 213C may detect the physical state of the occupant on the basis of the occupant monitoring data from the occupant monitoring apparatus 10 stored in the memory 220 (step S450).

In the case with the assignment processing G (step S420) in which "face and whole body" of the occupant are assigned to the part to be monitored by the occupant monitoring apparatus 10, the occupant state detection unit 213C may detect, for example, the occupant dozing, being fatigued, and/or looking aside while the vehicle is traveling.

In the case with the assignment processing H (step S430) in which "part of face and whole body" are assigned to the part to be monitored by the occupant monitoring apparatus 10, the occupant state detection unit 213C may detect, for example, the resting state and/or the sleeping state of the occupant while the vehicle is stopped.

The processor 210C may determine whether or not to continue the occupant state detection processing (step S460).

In a case where the processor 210C determines that the occupant state detection processing is to be continued ("YES" in step S460), the processor 210C may cause the processing to return to step S410, and continue the occupant state detection processing.

In a case where the processor 210C determines that the occupant state detection processing is not to be continued ("NO" in step S460), the processor 210C may end the occupant state detection processing.

<Workings and Effects>

As described above, in the occupant state detection system 1C according to this embodiment, the processor 210C may assign the face and the whole body of the occupant in the vehicle to the part to be monitored, in the case with the determination data indicating that the vehicle is in the traveling state. The processor 210C may assign a part of the face and the whole body of the occupant in the vehicle to the part to be monitored, in the case with the determination data indicating that the vehicle is in the stopped state. Thus, the processor 210C may detect the physical state of the occupant in the vehicle.

That is, in the case where the vehicle is in the traveling state, the occupant state detection system 1C may detect, for example, the occupant dozing or looking aside, on the basis of the occupant monitoring data such as "gaze direction, facial pose, number of blinks, eye aperture, eye movement, posture, and body motion", to detect immediately the occupant being in a serious state while driving.

In the case where the vehicle is in the stopped state, it is unnecessary to detect immediately the occupant being in a serious state, e.g., dozing or looking aside. Thus, the occupant state detection system 1C may detect the physical state of the occupant on the basis of the occupant monitoring data such as "facial pose, eye aperture, posture, and body motion".

In other words, the occupant state detection system 1C may make the assignment of the part to be monitored, to avoid acquiring the occupant monitoring data that is unnecessary for the detection of the physical state of the occupant in the stopped state of the vehicle.

This leads to the optimization of the monitoring method in the traveling state of the vehicle and the monitoring method in the stopped state of the vehicle in the detection of the physical state of the occupant. Hence, it is possible to accurately detect the physical state of the occupant.

Furthermore, in the case where the vehicle is in the traveling state, monitoring detailed data regarding the face of the occupant makes it possible to detect an internal state of the occupant, e.g., feeling stressed, being drowsy, driving inadvertently, and/or being fatigued. The internal state of the occupant is not to be determined solely by an external state of the occupant, e.g., the body motion and the posture.

In addition, in the case where the vehicle is in the stopped state, assigning "part of face and whole body" of the occupant to the part to be monitored, of the occupant in the vehicle, makes it possible to lower a processing load on the processor 210C. Hence, it is possible to lower power consumption of the processor 210C.

Moreover, it is possible for the processor 210C to use resource by which the processing load on the processor 210C is lowered, for processing such as new detection.

Additional Embodiment

In the occupant state detection systems 1, 1A, 1B, and 1C described above, the physical state of the occupant is detected on the basis of the occupant monitoring data acquired from image data captured by the camera included in the occupant monitoring apparatus 10. Alternatively, the physical state of the occupant may be detected on the basis of the occupant monitoring data acquired from a first occupant monitoring apparatus including a camera and a second occupant monitoring apparatus including millimeter-wave radar.

In the following, an occupant state detection system 1D including the first occupant monitoring apparatus and the second occupant monitoring apparatus as mentioned above is described with reference to FIGS. 14 and 15.

<Configuration of Occupant State Detection System 1D>

Figure 14:
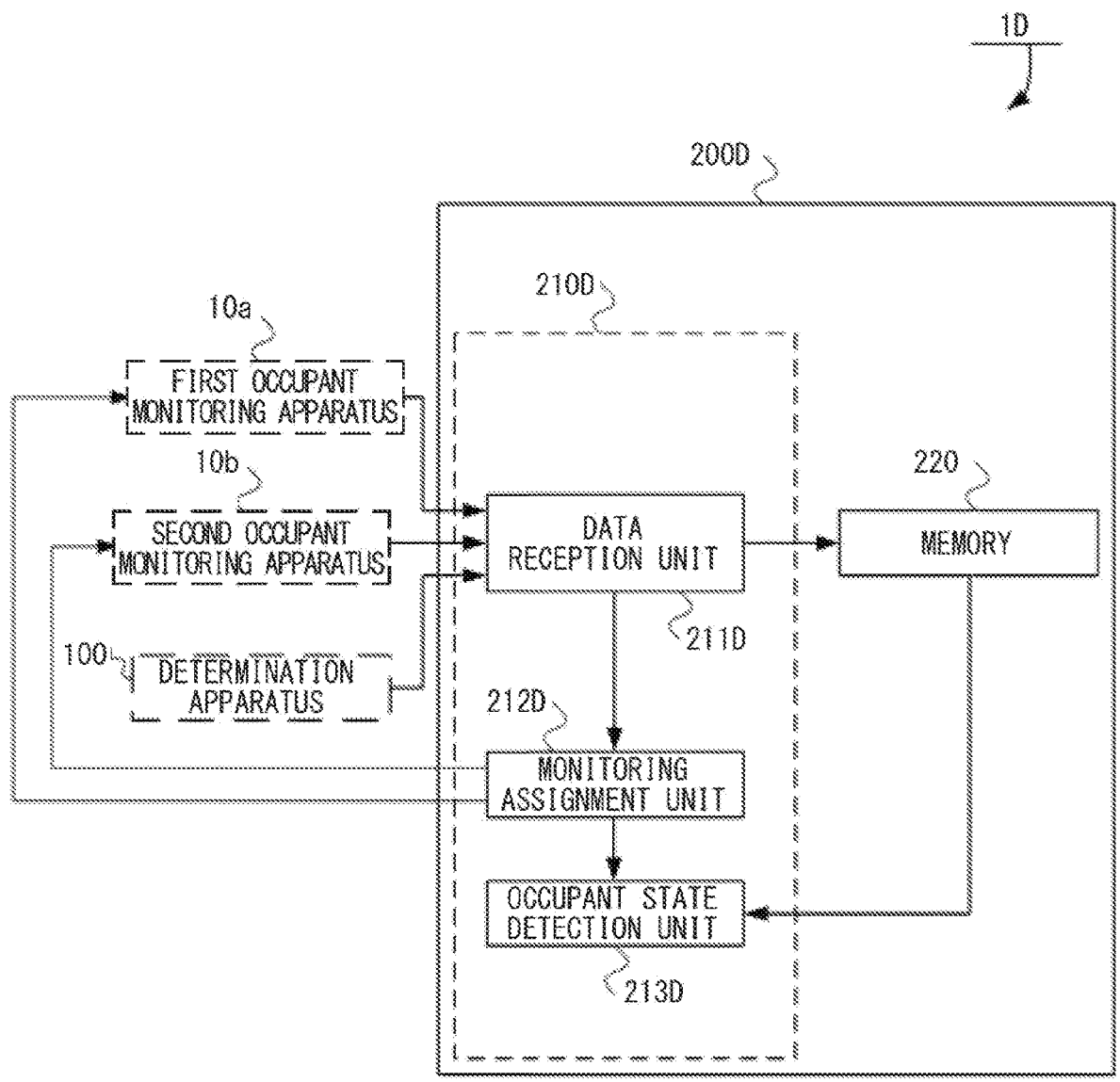
FIG. 14 is a block diagram illustrating a configuration of an occupant state detection system according to an additional embodiment of the disclosure.

As illustrated in FIG. 14, the occupant state detection system 1D according to this embodiment may include, without limitation, a first occupant monitoring apparatus 10a, a second occupant monitoring apparatus 10b, the determination apparatus 100, and an occupant state detection apparatus 200D.

The first occupant monitoring apparatus 10a may be the same as the occupant monitoring apparatus 10 included in the occupant state detection systems 1, 1A, 1B, and 1C. The first occupant monitoring apparatus 10a is configured to acquire the occupant monitoring data with the camera. The second occupant monitoring apparatus 10b is configured to acquire the occupant monitoring data with millimeter-wave radar.

The millimeter-wave radar of the second occupant monitoring apparatus 10b may be rather spaced away from the camera of the first occupant monitoring apparatus 10a.

The use of millimeter-wave radar makes it possible to monitor an occupant in the vehicle even in a case where the camera fails to acquire an image of the occupant in the vehicle because of an obstacle.

That is, the second occupant monitoring apparatus 10b is configured to obtain the occupant monitoring data regarding an occupant present in an uncapturable range of the camera or a partly capturable range of the camera.

For example, the second occupant monitoring apparatus 10b is configured to acquire the occupant monitoring data regarding an occupant reclining their seat taking a rest or sleeping and/or an occupant seated on a rear seat.

Furthermore, the second occupant monitoring apparatus 10b is configured to acquire "biological data" such as the heart rate, the heart rate variability, the respiration rate, and the brain wave.

That is, the second occupant monitoring apparatus 10b is configured to obtain biological data to monitor, for example, a health state of an occupant. The health state of an occupant is difficult to observe from outside.

<Configuration of Occupant State Detection Apparatus 200D>

As illustrated in FIG. 14, the occupant state detection apparatus 200D may include, without limitation, a processor 210D and the memory 220.

The occupant state detection apparatus 200D may make the assignment of the part to be monitored and the data to be acquired, of the occupant in the vehicle, to be monitored by the first occupant monitoring apparatus 10a and the second occupant monitoring apparatus 10b in a case where the occupant state detection apparatus 200D has received the data indicating that the vehicle is in the stopped state from the determination apparatus 100.

It is to be noted that details of assignment processing of the part to be monitored and the data to be acquired are described later. The assignment processing is to be carried out by the occupant state detection apparatus 200D.

The occupant state detection apparatus 200D may receive the occupant monitoring data from the first occupant monitoring apparatus 10a and the second occupant monitoring apparatus 10b.

On the basis of the occupant monitoring data acquired by the first occupant monitoring apparatus 10a and the second occupant monitoring apparatus 10b, the occupant state detection apparatus 200D may detect the physical state of the occupant.

<Configuration of Processor 210D>

As illustrated in FIG. 14, the processor 210D may include, without limitation, a data reception unit 211D, a monitoring assignment unit 212D, and an occupant state detection unit 213D.

The data reception unit 211D may store the occupant monitoring data received from the first occupant monitoring apparatus 10a and the second occupant monitoring apparatus 10b, in the memory 220.

The monitoring assignment unit 212D may make the assignment of the part to be monitored and the data to be acquired, of the occupant in the vehicle, to be monitored by the first occupant monitoring apparatus 10a and the second occupant monitoring apparatus 10b in a case where the monitoring assignment unit 212D has received the data indicating that the vehicle is in the traveling state from the data reception unit 211D.

In one example, as summarized in FIG. 15, in the case where the monitoring assignment unit 212D has received the data indicating that the vehicle is in the traveling state from the data reception unit 211D, the monitoring assignment unit 212D may assign "face" to the part to be monitored by the first occupant monitoring apparatus 10a and the second occupant monitoring apparatus 10b.

Thus, the monitoring assignment unit 212D may assign "expression" to the data to be acquired by the first occupant monitoring apparatus 10a, and assign "expression" and "biological data" to the data to be acquired by the second occupant monitoring apparatus 10b (assignment processing I).

In a case where the monitoring assignment unit 212D has received the data indicating that the vehicle is in the stopped state from the data reception unit 211D, the monitoring assignment unit 212D may assign "whole body" to the part to be monitored by the first occupant monitoring apparatus 10a and the second occupant monitoring apparatus 10b.

Thus, the monitoring assignment unit 212D may assign "behavior" to the data to be acquired by the first occupant monitoring apparatus 10a, and assign "behavior" and "biological data" to the data to be acquired by the second occupant monitoring apparatus 10b (assignment processing J).

The occupant state detection unit 213D is configured to detect the physical state of the occupant on the basis of the occupant monitoring data from the first occupant monitoring apparatus 10a and the second occupant monitoring apparatus 10b stored in the memory 220.

In one example, as summarized in FIG. 15, the occupant state detection unit 213D may detect, for example, the occupant dozing, being fatigued, looking aside, and/or feeling stressed on the basis of the occupant monitoring data to be obtained in a case where the assignment processing I is carried out, i.e., data regarding "expression" and "biological data" of the occupant, e.g., "gaze direction, facial pose, eye aperture, number of blinks, and eye movement" and "heart rate, heart rate variability, respiration rate, and brain wave".

Moreover, the occupant state detection unit 213D may detect, for example, the resting state, the sleeping state, and the quality of sleep of the occupant in the vehicle on the basis of the occupant monitoring data to be obtained in a case where the assignment processing J is carried out, i.e., data regarding "behavior" and "biological data" of the occupant, e.g., "posture, body motion, sleeping time, number of times occupant turns over during their sleep, and resting time" and "heart rate, heart rate variability, respiration rate, and brain wave".

<Workings and Effects>

As described above, in the occupant state detection system 1D according to this embodiment, the second occupant monitoring apparatus 10b may include the millimeter-wave radar. Hence, it is possible to acquire the detailed biological data regarding the occupant.

Thus, the use of the detailed biological data regarding the occupant makes it possible to detect the physical state of the occupant accurately.

Moreover, in the occupant state detection system 1D according to this embodiment, the second occupant monitoring apparatus 10b may include the millimeter-wave radar. Hence, it is possible to acquire the occupant monitoring data regarding an occupant present at an uncapturable position with the camera.

This makes it possible to interpolate the occupant monitoring data that has not been acquired with the camera, with the occupant monitoring data acquired with the millimeter-wave radar. Hence, it is possible to detect the physical state of the occupant accurately.

Modification Examples

For example, in the forgoing embodiments, the occupant state detection apparatus 200 may include the monitoring assignment unit 212 and the occupant state detection unit 213. However, an alternative configuration may be possible in which the data from the occupant monitoring apparatus 10 may be transferred to a server coupled to the vehicle, to allow the server to carry out the processing by the monitoring assignment units 212, and the processing by the occupant state detection units 213.

This makes it possible to process many pieces of data quickly. Hence, it is possible to detect accurately, for example, the physical state of the occupant in the stopped state of the vehicle.

According to the aspects of the technology, one or more processors may assign a face of an occupant in a vehicle to a part to be monitored on the condition that determination data indicates that the vehicle is in a traveling state, and assign a whole body of the occupant in the vehicle to the part to be monitored on the condition that the determination data indicates that the vehicle is in a stopped state, to detect a physical state of the occupant in the vehicle.

According to the aspects of the technology, one or more processors may assign a driver of a vehicle to a part to be monitored on the condition that determination data indicates that the vehicle is in a traveling state, and assign every occupant in the vehicle to the part to be monitored on the condition that the determination data indicates that the vehicle is in a stopped state, to detect a physical state of the occupant in the vehicle.

According to the aspects of the technology, one or more processors may assign a face and a whole body of an occupant in a vehicle to a part to be monitored on the condition that determination data indicates that the vehicle is in a traveling state, and assign a part of the face and the whole body of the occupant in the vehicle to the part to be monitored on the condition that the determination data indicates that the vehicle is in a stopped state, to detect a physical state of the occupant in the vehicle.

According to the aspects of the technology, it is possible to optimize a monitoring method for a vehicle in a traveling state and a monitoring method for a vehicle in a stopped state, to detect accurately a physical state of an occupant.

The occupant state detection systems 1, 1A, 1B, 1C, and 1D of the example embodiments of the disclosure may be realized by recording the processing by the processors 210, 210A, 210B, 210C, and 210D in a recording medium readable by a computer system, and by causing the processor 210, 210A, 210B, 210C, and 210D to read and execute a program stored in the recording medium. A computer system as used herein includes an operating system and hardware such as peripheral devices.

In the case with the use of the WWW (World Wide Web) system, the "computer system" also includes an environment that provides and/or displays a website. The program may be transmitted from the computer system in which the program is stored in a storage device, etc., to another computer system through a transmission medium or by a transmission wave in the transmission medium. Here, the "transmission medium" that transmits the program refers to a medium configured to transmit data, e.g., a network (communication network) such as the Internet or a communication line such as a telephone line.

Furthermore, the program as mentioned above may be one that realizes a portion of the processing described above.

In addition, the program may be a so-called differential file, or a differential program, that is able to realize the processing described above by a combination with a program already stored in the computer system.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

Each of the processors 210, 210A, 210B, 210C, and 210D illustrated in FIGS. 2, 5, 8, 11, and 14 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the processors 210, 210A, 210B, 210C, and 210D illustrated in FIGS. 2, 5, 8, 11, and 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the processors 210, 210A, 210B, 210C, and 210D illustrated in FIGS. 2, 5, 8, 11, and 14.

The invention claimed is:

1. An occupant state detection system comprising:
an occupant monitoring apparatus configured to monitor a physical state of an occupant in a vehicle;
an occupant state detection apparatus configured to detect the physical state of the occupant in the vehicle on a basis of occupant monitoring data from the occupant monitoring apparatus; and
a determination apparatus configured to determine whether the vehicle is in a traveling state or a stopped state, wherein
the occupant state detection apparatus includes
one or more processors, and
one or more memories configured to be communicably coupled to the one or more processors,
the one or more processors are configured to cooperate with one or more programs included in the one or more memories to
receive the occupant monitoring data and determination data from the determination apparatus,
store the received occupant monitoring data and the received determination data in the one or more memories, and
on a basis of the determination data, assign a part of the occupant in the vehicle as a target to be monitored by the occupant monitoring apparatus, to detect the physical state of the occupant,
the occupant monitoring apparatus includes a camera configured to capture an image of the occupant in the vehicle, and
the occupant monitoring apparatus is configured to acquire the occupant monitoring data and transmit the occupant monitoring data to the one or more processors, the occupant monitoring data including expression and behavior of the occupant in the vehicle, and
on a condition that the one or more processors determine, on a basis of the occupant monitoring data, that the occupant is in a sleeping state, with the determination data indicating that the vehicle is in the stopped state, the one or more processors are configured to assign a whole body of the occupant in the vehicle as the target to be monitored, to detect the physical state of the occupant.

2. The occupant state detection system according to claim 1, wherein
the determination apparatus is configured to
acquire ignition data whether ignition in an ON state or an OFF state in the vehicle,
transmit, to the one or more processors, the determination data indicating that the vehicle is in the stopped state, on a condition that ignition is in the OFF state, and
transmit, to the one or more processors, the determination data indicating that the vehicle is in the traveling state, on a condition that the ignition is in the ON state.

3. An occupant state detection system comprising:
an occupant monitoring apparatus configured to monitor a physical state of an occupant in a vehicle;
an occupant state detection apparatus configured to detect the physical state of the occupant in the vehicle on a basis of occupant monitoring data from the occupant monitoring apparatus; and
a determination apparatus configured to determine whether the vehicle is in a traveling state or a stopped state, wherein
the occupant state detection apparatus includes
one or more processors, and
one or more memories configured to be communicably coupled to the one or more processors,
the one or more processors are configured to cooperate with one or more programs included in the one or more memories to
receive the occupant monitoring data and determination data from the determination apparatus,
store the received occupant monitoring data and the received determination data in the one or more memories, and
on a basis of the determination data, of assign a part of the occupant in the vehicle as a target to be monitored by the occupant monitoring apparatus, to detect the physical state of the occupant,
the occupant monitoring apparatus includes a camera configured to capture an image of the occupant in the vehicle, and
the occupant monitoring apparatus is configured to acquire the occupant monitoring data and transmit the occupant monitoring data to the one or more processors, the occupant monitoring data including expression and behavior of the occupant in the vehicle, and
on a condition that the one or more processors determine, on a basis of the occupant monitoring data, that the occupant is in a sleeping state, with the determination data indicating that the vehicle is in the stopped state, the one or more processors are configured to assign a part other than a face of the occupant in the vehicle as the target to be monitored, to detect the physical state of the occupant.

4. The occupant state detection system according to claim 3, wherein
the determination apparatus is configured to
acquire ignition data whether ignition in an ON state or an OFF state in the vehicle,
transmit, to the one or more processors, the determination data indicating that the vehicle is in the stopped state, on a condition that ignition is in the OFF state, and
transmit, to the one or more processors, the determination data indicating that the vehicle is in the traveling state, on a condition that the ignition is in the ON state.

5. An occupant state detection system comprising:
an occupant monitoring apparatus configured to monitor an occupant in a vehicle, wherein the occupant monitoring apparatus includes a camera configured to capture an image of the occupant in the vehicle;
a determination apparatus configured to determine whether the vehicle is in a traveling state or a stopped state;

one or more processors; and one or more memories that are coupled to one or more processors and store instructions, when executed by the one or more processors, causing the one or more processors to:

in response to determining whether the vehicle is in a traveling state or a stopped state, assign a body part of the occupant as a target body part to be monitored by the occupant monitoring apparatus and assign one or more types of data as target data to be obtained from monitoring the target body part of the occupant; and based on data from the occupant monitoring apparatus, determine a physical state of the occupant, wherein the one or more types of data includes one of expression and behavior of the occupant in the vehicle, wherein the occupant monitoring apparatus is configured to acquire data, from the occupant monitoring apparatus, including the one of expression and behavior of the occupant in the vehicle, and transmit the data to the one or more processors, and wherein in response to (1) determining, based on the data from the occupant monitoring apparatus, that the occupant is in a sleeping state, and (2) determining that the vehicle is in the stopped state, the one or more processors are further configured to assign (1) a whole body of the occupant in the vehicle, or (2) a body part other than a face of the occupant in the vehicle, as the target body part to be monitored, to determine the physical state of the occupant.

6. The occupant state detection system according to claim 5, wherein the determination apparatus is configured to:

acquire ignition data indicating whether ignition in an ON state or an OFF state in the vehicle;

transmit, to the one or more processors, first data indicating that the vehicle is in the stopped state in response to determining that that the ignition is in the OFF state; and transmit, to the one or more processors, second data indicating that the vehicle is in the traveling state in response to determining that the ignition is in the ON state, and wherein the one or more processors are configured to determine that (1) the vehicle is in the stopped state based on the first data and (2) the vehicle is in the traveling state based on the second data.

7. An occupant state detection system comprising:

an occupant monitoring apparatus configured to monitor an occupant in a vehicle, wherein the occupant monitoring apparatus includes a camera configured to capture an image of the occupant in the vehicle;

a determination apparatus configured to determine whether the vehicle is in a traveling state or a stopped state;

one or more processors; and one or more memories that are coupled to one or more processors and store instructions, when executed by the one or more processors, causing the one or more processors to:

in response to determining whether the vehicle is in a traveling state or a stopped state, assign a body part of the occupant as a target body part to be monitored by the occupant monitoring apparatus and assign one or more types of data as target data to be obtained from monitoring the target body part of the occupant;

based on data from the occupant monitoring apparatus, determine a physical state of the occupant;

in response to determining that the vehicle is the stopped state, determine whether the occupant is in a sleeping state;

in response to determining that occupant is in the sleeping state, assign a first part of occupant as the target body part to be monitored by the occupant monitoring apparatus and assign first data as the target data to be obtained from the occupant monitoring apparatus that monitors the first part of the occupant, and determine the physical state of the occupant based on the first data from the occupant monitoring apparatus; and in response to determining that occupant is not in the sleeping state, assign a second part of occupant, different from the first part, as the target body part to be monitored by the occupant monitoring apparatus and assign second data, different from the first data, as the target data to be obtained from the occupant monitoring apparatus that monitors the second part of the occupant, and determine the physical state of the occupant based on the second data from the occupant monitoring apparatus.

* * * * *